(12) United States Patent
Grover et al.

(10) Patent No.: US 10,409,230 B2
(45) Date of Patent: Sep. 10, 2019

(54) MULTI-AGENT CONTROL SYSTEM AND METHOD

(71) Applicant: Mitsubishi Electric Research Laboratories, Inc., Cambridge, MA (US)

(72) Inventors: Piyush Grover, Somerville, MA (US); Karthik Elamvazhuthi, Tempe, AZ (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 216 days.

(21) Appl. No.: 15/340,015

(22) Filed: Nov. 1, 2016

(65) Prior Publication Data

US 2018/0120775 A1 May 3, 2018

(51) Int. Cl.
| | | |
|---|---|---|
| *G05B 13/02* | (2006.01) | |
| *B25J 9/16* | (2006.01) | |
| *G05D 1/00* | (2006.01) | |

(52) U.S. Cl.
CPC .......... *G05B 13/021* (2013.01); *B25J 9/1682* (2013.01); *G05D 1/0027* (2013.01); *G05B 2219/32015* (2013.01); *G05B 2219/39155* (2013.01); *G05B 2219/39163* (2013.01)

(58) Field of Classification Search
CPC .................... G05D 1/0217; G05B 2219/39155
USPC .......................................................... 700/33
See application file for complete search history.

(56) References Cited

U.S. PATENT DOCUMENTS

| | | | |
|---|---|---|---|
| 8,634,982 B2 | 1/2014 | Khosla et al. | |
| 8,747,182 B2 | 6/2014 | Sofman et al. | |
| 2004/0134336 A1 | 7/2004 | Solomon | |
| 2007/0288132 A1 | 12/2007 | Lam | |
| 2017/0219353 A1* | 8/2017 | Alesiani | G05D 1/0217 |

OTHER PUBLICATIONS

Demir et al., "Decentralized probabilistic density control of autonomous swarms with safety constraints" Autonomous Robots, Dec. 2015, vol. 39, Issue 4, pp. 537-554 (Year: 2015).*

(Continued)

*Primary Examiner* — Emilio J Saavedra
(74) *Attorney, Agent, or Firm* — Gennadiy Vinokur; James McAleenan; Hironori Tsukamoto

(57) ABSTRACT

Motion of multiple agents with identical non-linear dynamics is controlled to change density of the agents from the initial to the final density. A first control problem is formulated for optimizing a control cost of changing density of the agents from the initial density to the final density subject to dynamics of the agents in a density space. The first control problem, which is a non-linear non-convex problem over a multi-agent control and a density of the agents, is transformed into a second control problem over the density of the agents and a product of the multi-agent control and the density of the agents. The second control problem is a non-linear convex problem that is solved to produce the control input for each section of the state space. A motion of each agent is controlled according to a control input corresponding to its section of the state space.

20 Claims, 22 Drawing Sheets

(56) References Cited

OTHER PUBLICATIONS

Chen, Yongxin, Tryphon T. Georgiou, and Michele Pavon. "Optimal steering of a linear stochastic system to a final probability distribution, Part I." IEEE Transactions on Automatic Control 61.5 (2016): 1158-1169.

Chen, Yongxin, Tryphon T. Georgiou, and Michele Pavon. "On the relation between optimal transport and Schrödinger bridges: A stochastic control viewpoint." Journal of Optimization Theory and Applications 169.2 (2016): 671-691.

Mas, Jaan, Gradient flows of the entropy for finite Markov chains, Journal of Functional Analysis 261, 2011.

Rastgoftar, Hossein. Planning and control of swarm motion as continua. Diss. University of Central Florida Orlando, Florida, 2013.

Frihauf, Paul, and Miroslav Krstic. "Leader-enabled deployment onto planar curves: A PDE-based approach." IEEE Transactions on Automatic Control 56.8 (2011): 1791-1806.

\* cited by examiner

MULTI-AGENT CONTROL SYSTEM AND METHOD

TECHNICAL FIELD

This invention relates to a multi-agent control system and method, and more specifically to the multi-agent control system and method suitable for controlling the agents having non-linear dynamics.

BACKGROUND

In some situations, there is a need to control multiple mobile agents according to a common objective. An agent can be any object capable to move in a controlled manner. Examples of the agents include mobile robots, UVs (Unmanned Vehicles), satellites, AUVs (Autonomous Underwater Vehicles), and solid particles in fluid flow. Each individual agent can move with prior dynamics, and its motion can be changed by control. All agents have same prior dynamics, and in a number of multi-agent control applications, such dynamic is non-linear.

Various multi-agent control applications aim to find control policies that move the agents to the desired states in an optimal manner. For example, one method computes individual optimal trajectories for all agents. However, this method is computationally expensive and does not scale when a number of agents is too high. Another method selects some agents as "leaders," determines the trajectories only for the leaders and applies some leader-following algorithms for other agents. However, this method is sensitive to the failure of the leader agents. Yet another method determines trajectories of the agents by considering only linear dynamics of agents. However, the assumption of the linear dynamics is inaccurate in many cases.

Accordingly, there is a need for the multi-agent control system and method suitable for controlling the agents having non-linear dynamics.

SUMMARY

It is an object of some embodiments to provide a system and a method for multi-agent control suitable for controlling the agents having non-linear dynamics. It is another object of some embodiment to provide a joint optimal control of the agents, while reducing the computational burden of the multi-agent control. However, some embodiments are based on recognition that if the agents have non-linear dynamics, such a joint control optimization is a non-linear non-convex problem, which can be difficult to solve.

Some embodiments are based on realization that in some applications, all agents are identical and have common objective of the control. In such cases, the state of individual agent is not as important as collective states of all agents. This realization results in re-labeling symmetry in the optimization problem. In turn, the re-labeling symmetry means that for some applications, density of the agents is sufficient to represent the states of the individual agents. To that end, some embodiments are based on realization that the control can be performed in the density space, rather than statespace.

Such a realization can be advantageous for the purposes of the multi-agent control, because in the density space, the natural, i.e., uncontrolled, non-linear dynamics of the agents become linear. However, the control of the agent is still non-linear and overall multi-agent control of the multiple agents in the density space is still a non-convex non-linear problem.

Some embodiments are based on recognition that control in the density space can be described using an analogy from fluid mechanics where the control can be related to flows and/or the rate of flows of the agents between neighboring sections of the state space. Using insights borrowed from this analogy, some embodiments convert multi-agent control problem from a non-linear non-convex problem to a nonlinear convex problem with a certain change of variables. For example, one embodiment converts a non-linear nonconvex control problem over a control and a density of the agents into a non-linear convex problem over the density of the agents and a product of the control and the density of the agents.

Such a product of the control and the density of the agents resembles the flow of the agents. Because the flow is related to the density of the agents, the control problem over the density of the agents and the product of the control and the density of the agents is convex. After this control problem is solved, the control can be recovered from the knowledge of the density of the agents and the product of the control and the density of the agents.

As used herein, the control is a function parameterized on a set of sections of the state space defining a control input for each section of the state space. Hence, instead of controlling individual agents having a state, the solution of the convex problem provides control for the section containing agents' state. To that end, some embodiments determine control inputs for various sections of the state space and cause the agents with state in a specific section to move according to the control input determined for that specific section. For example, one embodiment broadcasts a message to the agents specifying that if you are the agent with state in this specific section then this is your control input.

In some embodiments, the convex optimization is formulated using a graph-based approach, in which nodes of graph represent density of states of agents, and edges represent the flow of density under the combination of natural and (unknown) controlled dynamics. This graph-based approach allows considering relationship only between neighboring sections, i.e., nodes of the graph, which simplifies the computation and provides an extension to the theory of "optimal transport" for systems with non-linear dynamics.

Accordingly, one embodiment discloses a system for controlling a motion of multiple agents with identical nonlinear dynamics. The system includes a receiver to receive data indicative of at least one or combination of an initial density of the agents in a state space and a final density of the agents in the state space at a given time, wherein the state space is partitioned into a set of sections, such that a density of a section of the state space is proportional to a number of agents having states within the section of the state space; a processor configured to formulate a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space; transform the first control problem into a second control problem, wherein the second control problem is a non-linear convex problem over the density of the agents and a product of the multi-agent control and the density of the agents; and solve the second control problem to produce the control input for each section of the state space; and a controller to control a motion of each agent according to a control input corresponding to its section of the state space.

Another embodiment discloses a method for controlling a motion of multiple agents with identical non-linear dynamics. The method includes receiving data indicative of at least one or combination of an initial density of the agents in a state space and a final density of the agents in the state space at a given time, wherein the state space is partitioned into a set of sections, such that a density of a section of the state space is proportional to a number of agents having states within the section of the state space; formulating a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space; transforming the first control problem into a second control problem, wherein the second control problem is a non-linear convex problem over the density of the agents and a product of the multi-agent control and the density of the agents; solving the second control problem to produce the control input for each section of the state space; and controlling a motion of each agent according to a control input corresponding to its section of the state space. At least some steps of the method are performed using a processor.

Yet another embodiment discloses a non-transitory computer readable storage medium embodied thereon a program executable by a processor for performing a method, the method includes receiving data indicative of at least one or combination of an initial density of the agents in a state space and a final density of the agents in the state space at a given time, wherein the state space is partitioned into a set of sections, such that a density of a section of the state space is proportional to a number of agents having states within the section of the state space; formulating a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space; transforming the first control problem into a second control problem, wherein the second control problem is a non-linear convex problem over the density of the agents and a product of the multi-agent control and the density of the agents; solving the second control problem to produce the control input for each section of the state space; and controlling a motion of each agent according to a control input corresponding to its section of the state space.

DETAILED DESCRIPTION

Figure 1:
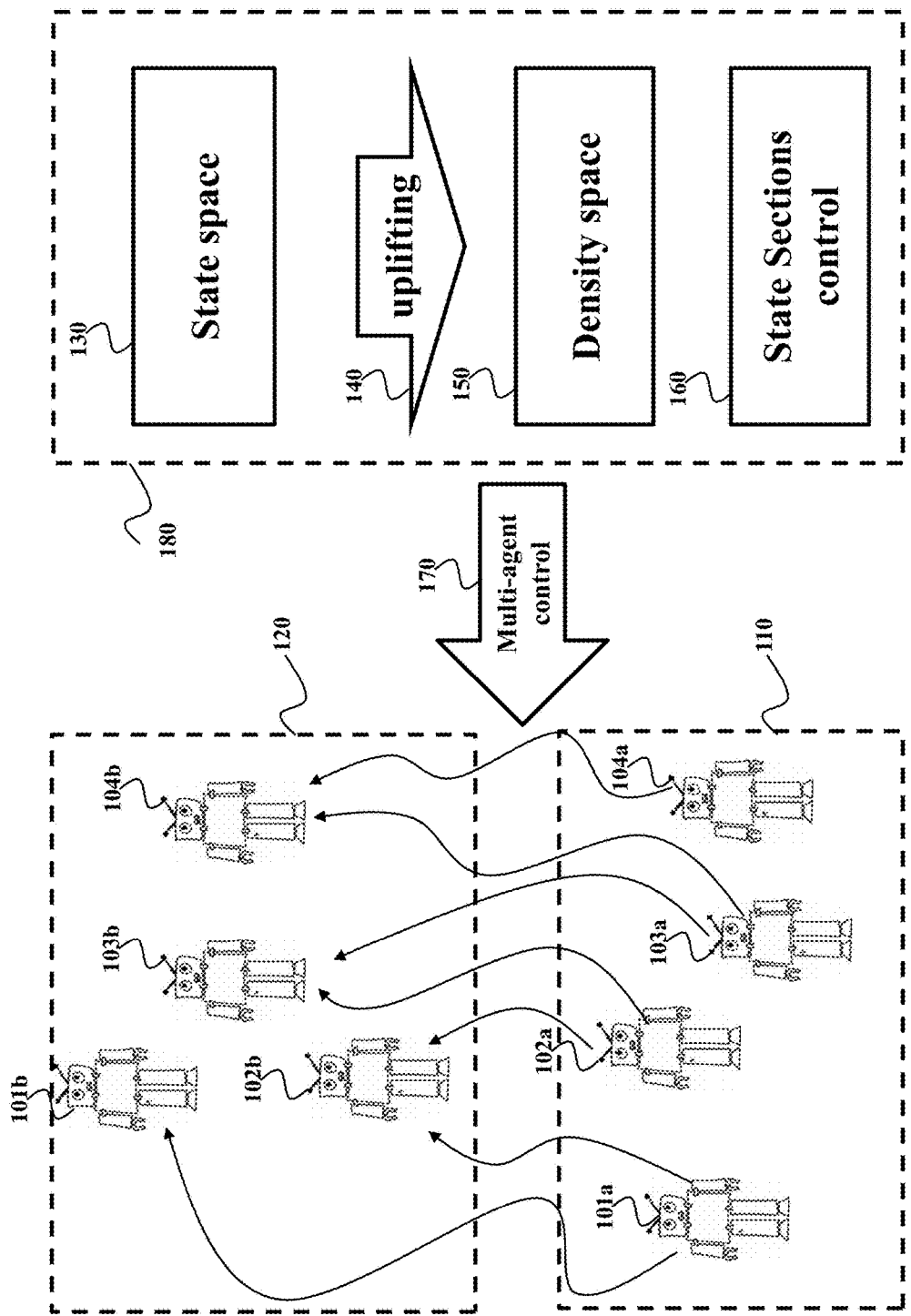
FIG. 1 is a schematic of a multi-agent control according to some embodiments.

FIG. 1 shows a schematic of a multi-agent control according to some embodiments. The agents having initial states 101a, 102a, 103a, and 104a are controlled 170 to move to final states 101b, 102b, 103b, and 104b at a given time. An agent can be any object capable to move in a controlled manner. Examples of the agents include mobile robots, UVs (Unmanned Vehicles), satellites, AUVs (Autonomous Underwater Vehicles), and solid particles in fluid flow. Each individual agent can move with prior dynamics, and its motion can be changed by control. In various embodiments of the multi-agent control, all agents have same dynamics, which can be non-linear.

Some embodiments are based on realization that there is a re-labeling symmetry in the control optimization problem for the agents with the identical dynamics. For example, the agent 101a can be moved to states 101b or 102b, and the agent 102a can be moved to states 102b or 103b. It does not matter which specific agent occupies the state 102b, because the agents are identical. Thus, for some applications, density of the agents can be used as a parameter of the control optimization. To that end, some embodiments address the problem of controlling the agents from an initial density to a final density, while minimizing a cost function of the multi-agent control.

For example, a multi-agent control system 180 controls 170 the agents to change their density in the state space from an initial density 110 to a final density 120. The state space of the agents depends on the specific application. For example, the state space can include positions and velocities of the agents. The system 180 lifts 140 the control optimization from the state space 130 to the density space 150 and perform the optimization of the multi-agent control in the density space.

The agents have prior natural, i.e., uncontrolled dynamics. This dynamic can be non-linear in the state space. However, in the density space, the natural, i.e., uncontrolled, non-linear dynamics of the agents become linear. To that end, some embodiments perform the control in the density space, rather than state-space. Hence, instead of controlling individual agents, the solution of the control optimization problem provides control for all agents with given state. To that end, some embodiments determine control inputs for various sections of the state space and cause 160 the agents with state in a specific section to move according to the control input determined for that specific section. For example, the embodiment can broadcast a message to the agents specifying that if you are the agent is this specific state then this is your control input.

Some embodiments are based on a realization that even if uncontrolled dynamics of the agents become linear in the density space, the control of the agents in the density space is still non-linear and overall control of the multiple agents in the density space is still a non-convex non-linear problem. Specifically, adding the control term to the uncontrolled dynamic makes the control problem non-convex and bilinear, which is a special type of nonlinearity, where the control and the state are multiplied. Accordingly, there is a need to convert this non-convex control problem into a convex problem.

Figure 2:
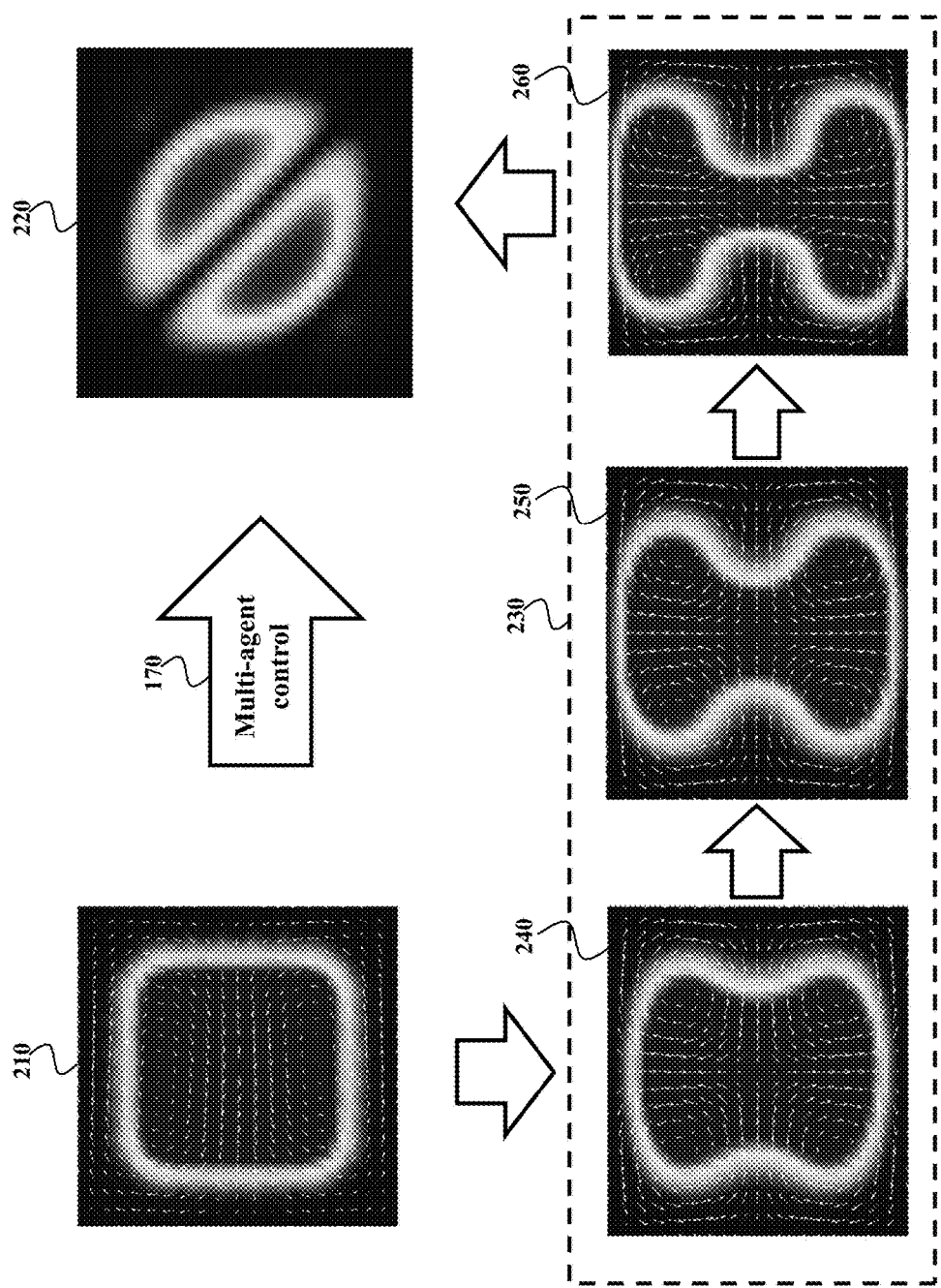
FIG. 2 is a schematic of controlled and uncontrolled dynamics of the agents used by some embodiments.

FIG. 2 shows a schematic of controlled and uncontrolled dynamics of the agents used by some embodiments. The uncontrolled dynamics 230 changes the initial density 210 to densities 240, 250, and 260 at different points of time. The multi-agent control 170 is determined such that a combination of the uncontrolled dynamic 230 and the multi-agent control 170 changes the initial density 210 to the final density 220.

Some embodiments are based on recognition that control in the density space can be described using an analogy from fluid mechanics where the control can be related to flows and/or the rate of flows of the agents between neighboring sections of the state space. Using insights borrowed from this analogy, some embodiments convert control problem from non-linear non-convex to non-linear convex problem with a certain change of variables. For example, one embodiment converts a non-linear non-convex control problem over a control and a density of the agents into a non-linear convex problem over the density of the agents and a product of the control and the density of the agents.

Figure 3:
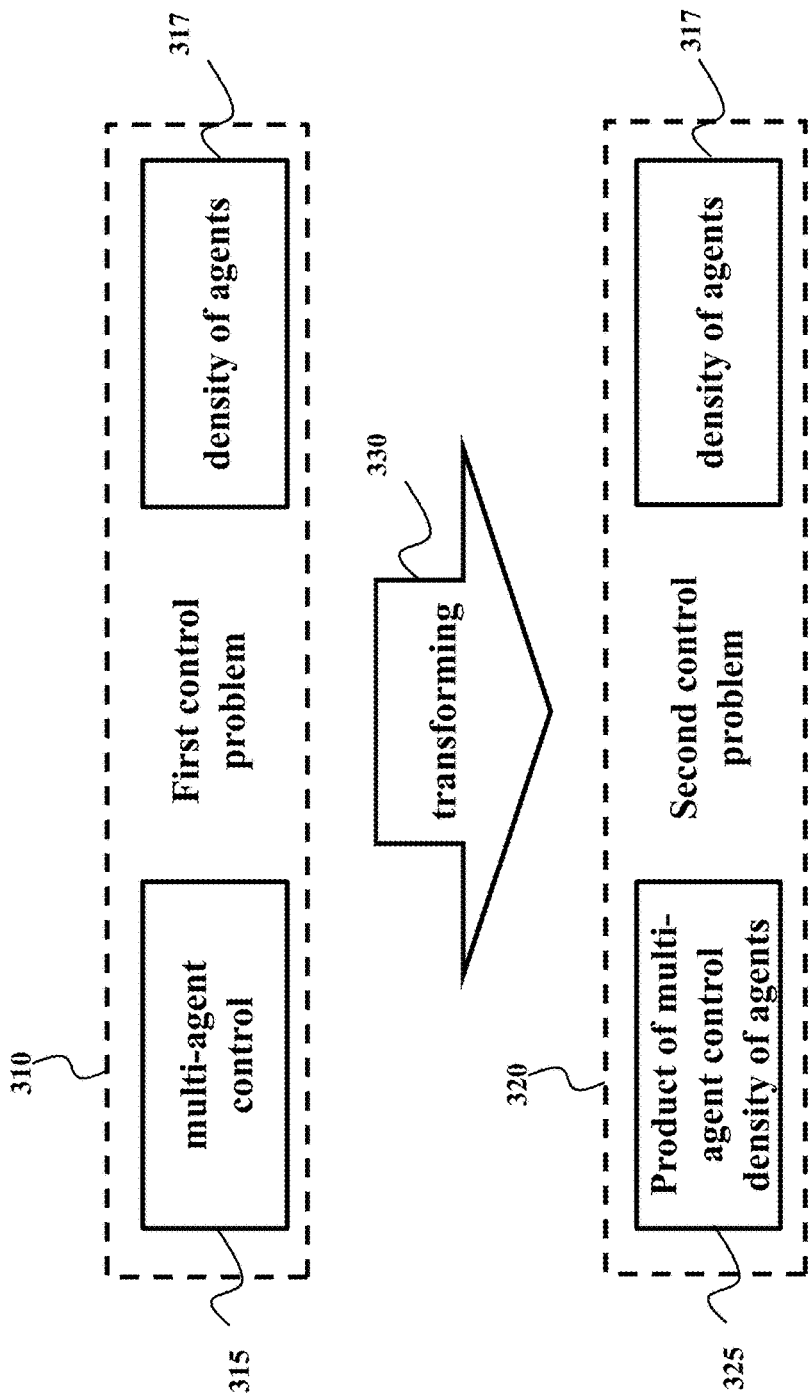
FIG. 3 is a schematic of transforming the non-convex multi-agent control problem into a convex multi-agent control problem according to one embodiment.

FIG. 3 shows a schematic of transforming the non-convex multi-agent control problem into a convex multi-agent control problem according to one embodiment. The embodiment formulates a first control problem 310 over the multi-agent control 315 and the density of the agent 317 at a given time. The multi-agent control 315 is a function parameterized on the set of sections of the state space defining a control input for each section of the state space. Such a control input represents external force acting on an agent. For example, the state space is a rectangle defining a portion of all possible values of the state. This rectangular state space can be divided into square sections. Then, the control value is a function of the coordinates (x,y) of center of each square. In turn, the density of the agent 317 represents the uncontrolled prior non-linear dynamic of the agents. Because both the controlled and uncontrolled dynamics change the density of the agents, the first control problem includes a product of the multi-agent control and the density of the agents, which makes the first control problem 310 non-convex.

Some embodiments are based on realization that a product of the control and the density of the agents represents the flow of the agents. By replacing the product by one new variable, the dynamics are now linear in this new variable. The control term is now of the form 'quadratic over linear', which is a convex function of the new variables. To that end, one embodiment transforms 330 the first control problem 310 into a second control problem 320 over the density of the agents and a product of the multi-agent control and the density of the agents. As the result, the second control problem is a non-linear convex problem. After this control problem is solved, the control can be recovered from the knowledge of the density of the agents and the product of the control and the density of the agents.

Figure 4:
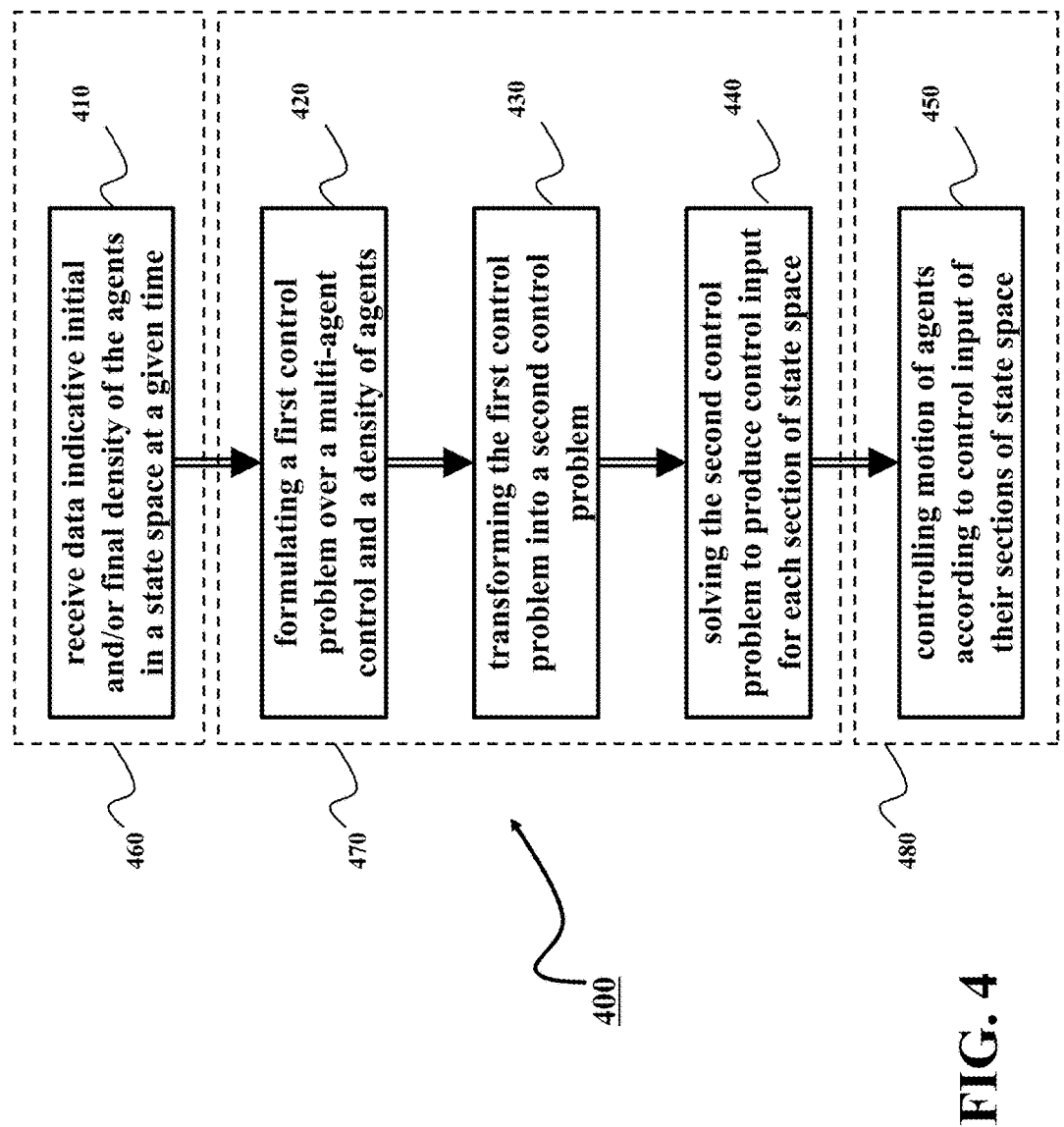
FIG. 4 is a block diagram of a system and a method for controlling a motion of multiple agents with identical non-linear dynamics according to one embodiment.

FIG. 4 shows a block diagram of a system and a method 400 for controlling a motion of multiple agents with identical non-linear dynamics according to one embodiment. The embodiment receives 410 data indicative of at least one or combination of an initial density of the agents in a state space and a final density of the agents in the state space at a given time. For example, the data can be received using a receiver 410 over a wired or wireless channel. The state space is partitioned into a set of sections, such that a density of a section of the state space is proportional to a number of agents having states within the section of the state space. The sections of the state space can be predetermined and stored in a memory of the system 400 (not shown).

Figure 5:
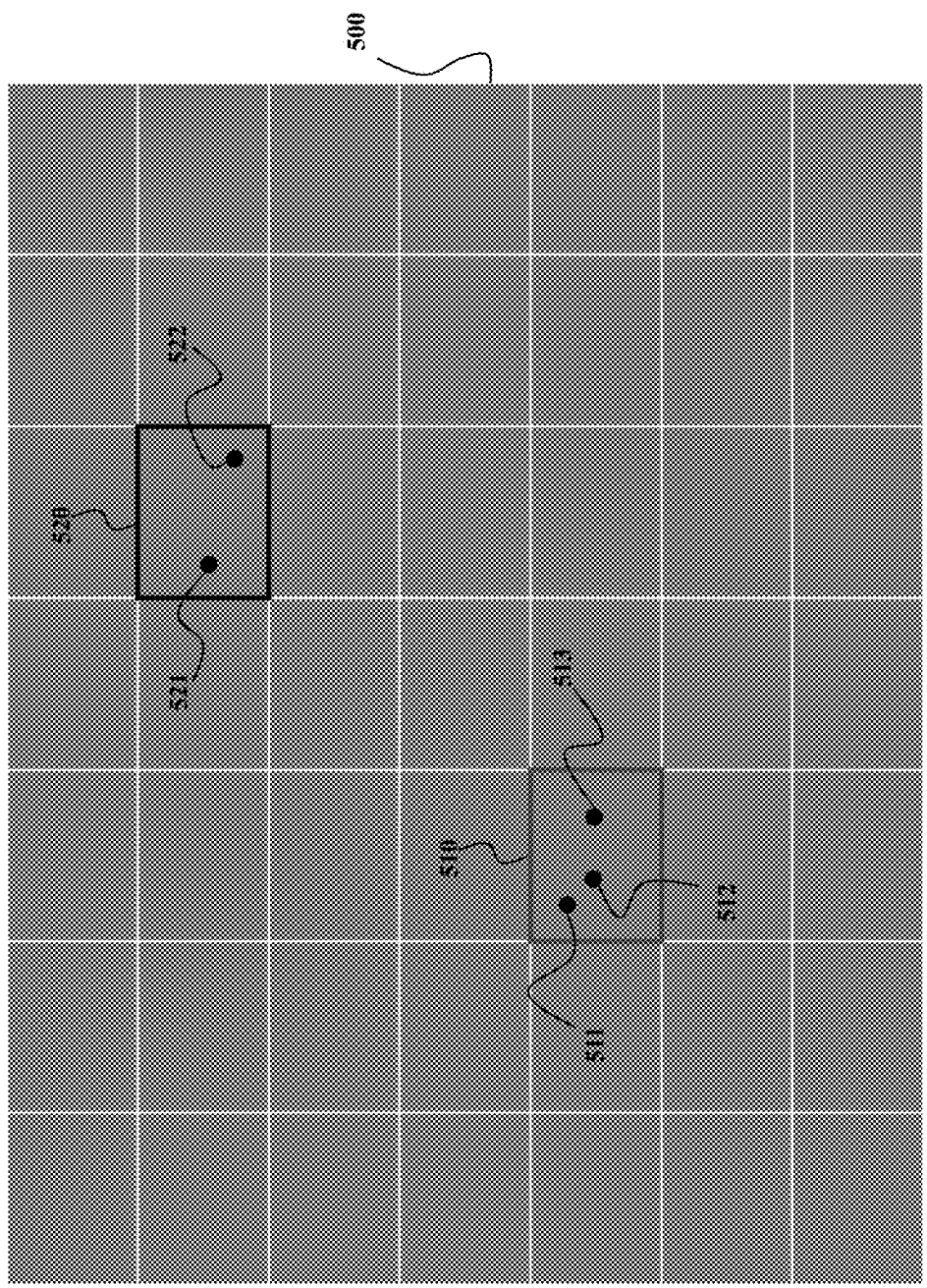
FIG. 5 is an exemplar schematic of a state space partitioned into a set of sections according to some embodiments.

FIG. 5 shows an exemplar schematic of a state space 500 partitioned into a set of sections including a first section 510 and a second section 520. In this example, the first section 510 includes three agents 511, 512, and 513. The second section 520 includes two agents 521 and 522. According to the principle of one embodiment, in this example, the density of section 510 is proportional to a number three and the density of the section 520 is proportional to a number two. The densities of all sections of the set of sections of the state space form the density of the agents, such as initial, final or intermediate density.

The embodiment formulates 420 a first control problem optimizing a control cost subject to dynamics of the agents in a density space. The first control problem is a non-linear non-convex control problem 310 over a multi-agent control and a density of the agents. The multi-agent control is a function parameterized on the set of sections of the state space defining a control input for each section of the state space. For example, the multi-agent control defines a set of control inputs, wherein there is one input for each section of the state. For example, the multi-agent control includes a first control input for the first section 510 and a second control input for the second section 520.

After the control problem is solved, all agents in the same section of the state are similarly controlled according to the same control input. For example, because the agents 511, 512, and 513 have states falling within the same state section 510, for a given time those agents are controlled according to the same controlled input. However, the same control input can move the agents into the different sections of the state space. Thus, for different steps of the control, the agents 511, 512, and 513 can be controlled according to different control inputs.

The first control problem is non-linear non-convex problem. Accordingly, the embodiment transforms 430 the first control problem into a second control problem over the density of the agents and a product of the multi-agent control and the density of the agents. For example, the product of the multi-agent control and the density of the agents is replaced with a variable in the second control problem. The second control problem is a non-linear convex problem. The embodiment solves the second control problem to produce the control input for each section of the state space and control a motion of each agent according to a control input corresponding to its section of the state space.

For example, the embodiment can use a processor 470 to formulate, transform, and solve to control problem. The processor 470 can be configured to execute instructions stored in the memory (not shown). The processor 470 can be a single core processor, a multi-core processor, a computing cluster, or any number of other configurations. The memory can include random access memory (RAM), read only memory (ROM), flash memory, or any other suitable memory systems.

The embodiment can use a controller 480 to control the motion of each agent. For example, in one implementation, the controller includes a transmitter to transmit, e.g., broadcast or unicast, a command to each agent to apply a control input corresponding to its section of the state space. Additionally or alternatively, in one implementation, the controller includes an actuator to apply a control input corresponding to its section of the state space. For example, the actuator can include a magnetic actuator for applying a magnetic field determined by the control inputs to the agents.

In one embodiment, the convex optimization is formulated using a graph-based framework, in which nodes of graph represent density of states of agents, and edges represent the flow of density under the combination of natural and controlled dynamics. This graph-based framework allows considering relationship only between neighboring sections of the state space, i.e., nodes of the graph, which simplifies the computation and provides an extension to the theory of "optimal transport" for systems with non-linear dynamics.

Figure 6:
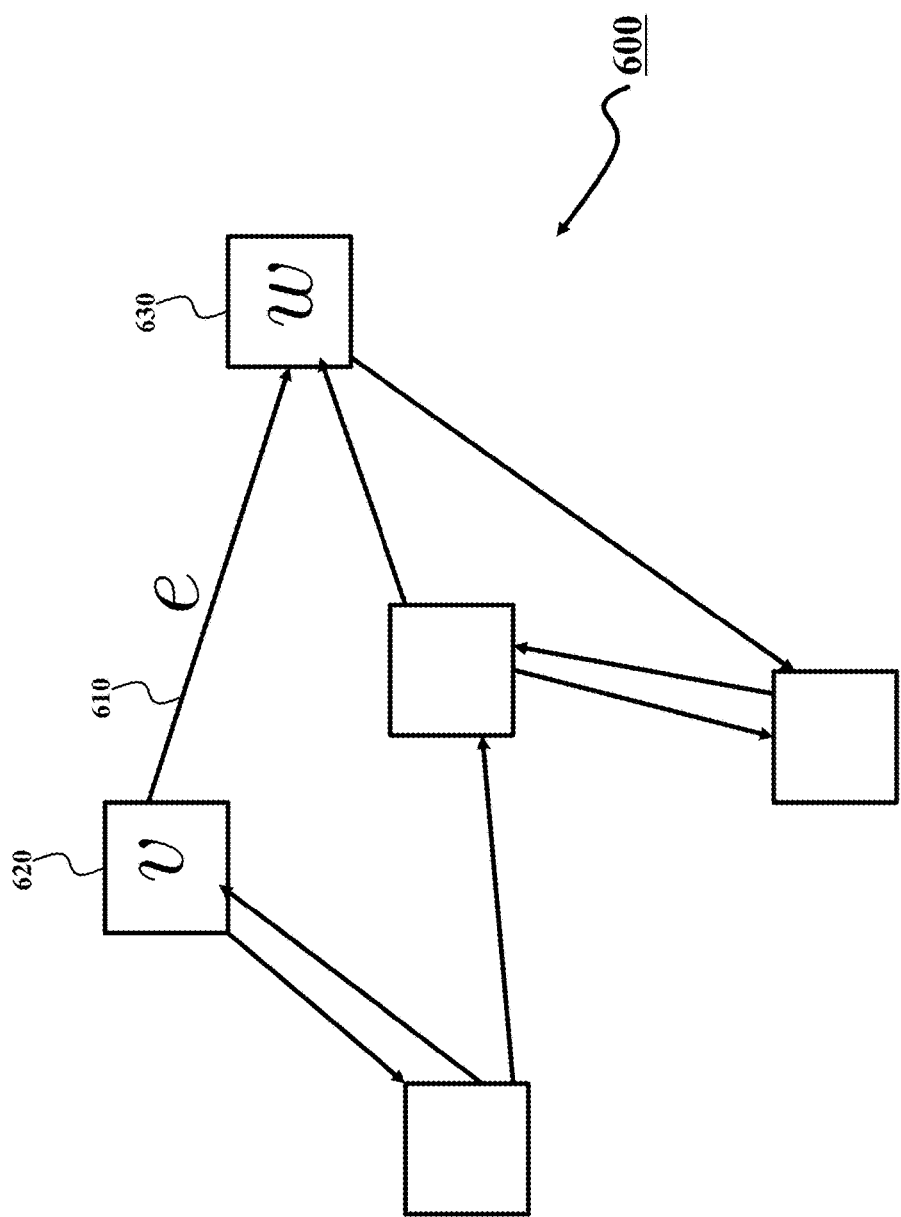
FIG. 6 is an exemplar graph representing the set of sections of the state space according some embodiments.

FIG. 6 shows an exemplar graph 600 representing the set of sections of the state space according some embodiments. Each vertex of the graph 600, such as a vertex 620 and a vertex 630, represents a section of the state space. The vertexes representing the neighboring sections are connected by edges, such as an edge 610. In different embodiments, the density is specified by its "mass" on each vertex of the graph and the edges can be one directional to specifically point the direction of the flow of the agents between the sections. Additionally or alternatively, the edges can point in both directions indicating that the exchange of the agents between the sections is possible. The type of the edges can be determined, e.g., from type of the dynamics of the agents and/or from relationship among values of the states in the sections.

The graph-based framework allows for computing time-varying flow of agents between neighboring vertices, rather than the much more computationally expensive step of computing transport from all locations to all other locations. Because only neighboring nodes/sections are connected, the graph 600 is sparse. Some embodiments exploit the sparsity in the resulting graph structure to obtain computational advantage. The problem is converted into a convex optimization problem by a change of variables, again motivated by developments in fluid mechanics. Rather than computing control amplitudes, some embodiment compute optimal flows or fluxes of agents. Once these optimal flows or fluxes of agents are computed, the control inputs can be found by a post-processing step.

Figure 7A:
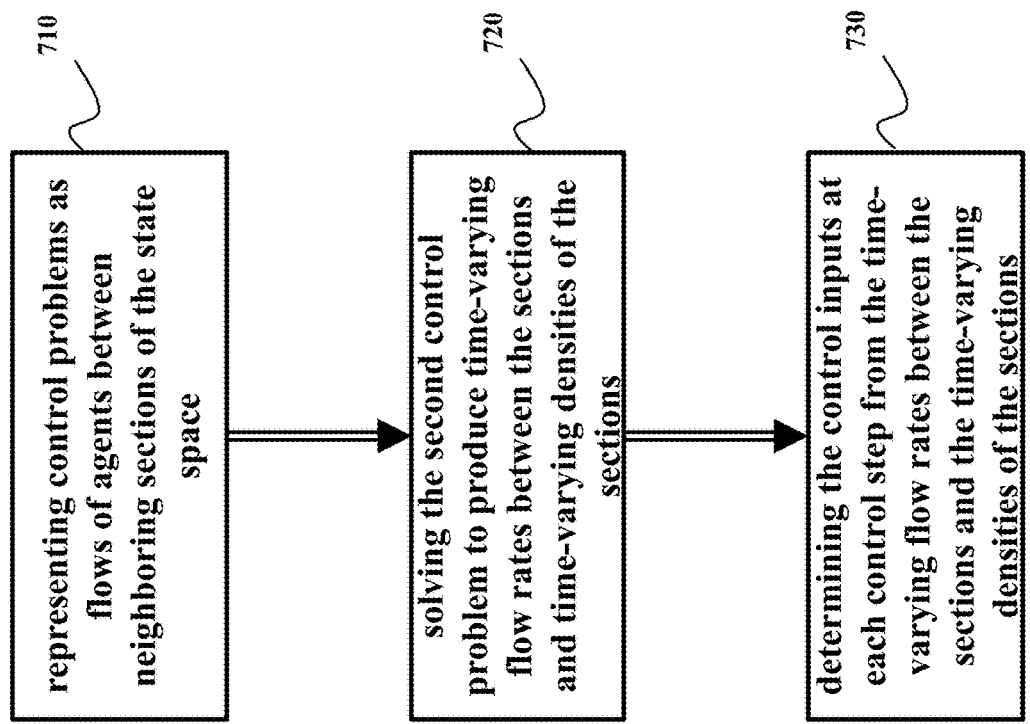
FIG. 7A is a flow chart of a method for multi-agent control using time-varying flow of agents according to one embodiment.

FIG. 7A shows a flow chart of a method for multi-agent control using time-varying flow of agents according to one embodiment. The method represents 710 the first and the second control problems as a sequence of flows of the agents between neighboring sections of the state space. Rather than controlling each agent, these control problems are formulated to compute the velocity field which leads to appropriate final density of agents.

The method solves 720 the second control problem to produce time-varying flow rates between the sections and time-varying densities of the sections. Because the second problem is convex, various solutions for the convex problems are used by different embodiments. For example, some embodiments use the alternating direction method of multipliers (ADMM) that solves convex optimization problems by breaking them into smaller pieces. Next, the method determines 730 the control inputs at each control step from the time-varying flow rates between the sections and the time-varying densities of the sections.

Figure 7B:
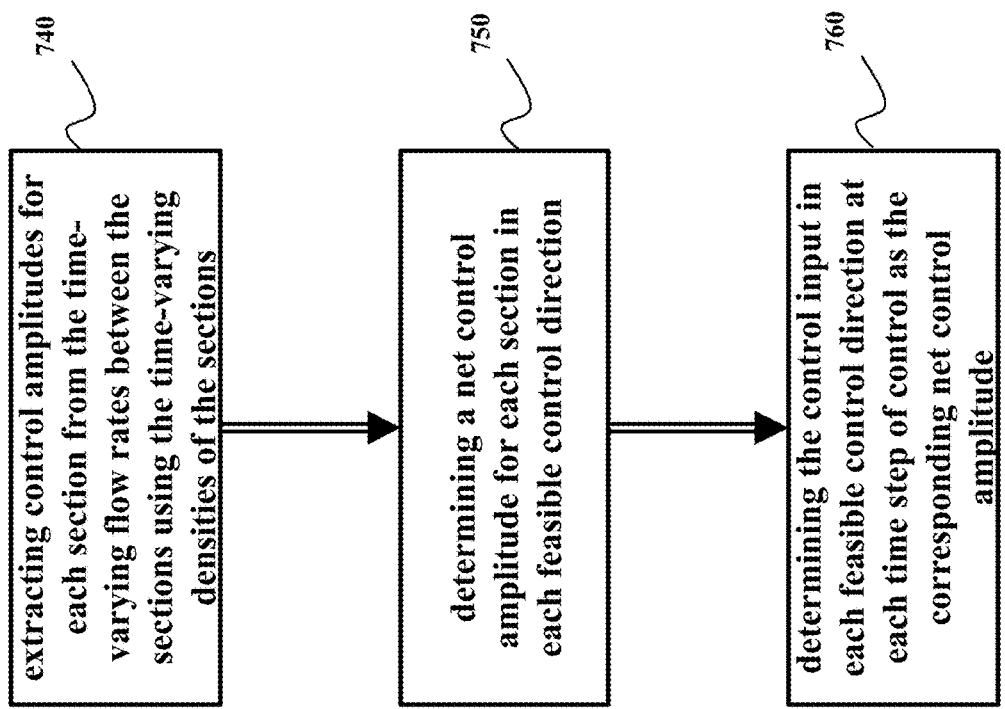
FIG. 7B is a flow chart of a method for determining the control inputs according to one embodiment.

FIG. 7B shows a flow chart of a method for determining 720 the control inputs from the time-varying flow rates between the sections and the time-varying densities of the sections according to one embodiment. The method of FIG. 7B extracts 740 control amplitudes for each section at each time step of the control from the time-varying flow rates between the sections using the time-varying densities of the sections. For example, the method divides the flow rates by the densities to obtain control amplitudes.

Next, the method determines 750 a net control amplitude for each section in each feasible control direction at each time step of control by combining adding incoming control amplitudes of all incoming flows and subtracting control amplitudes of all outgoing flow, for each direction. Next, the method determines 760 the control input in each feasible control direction at each time step of control as the corresponding net control amplitude.

Figure 7C:
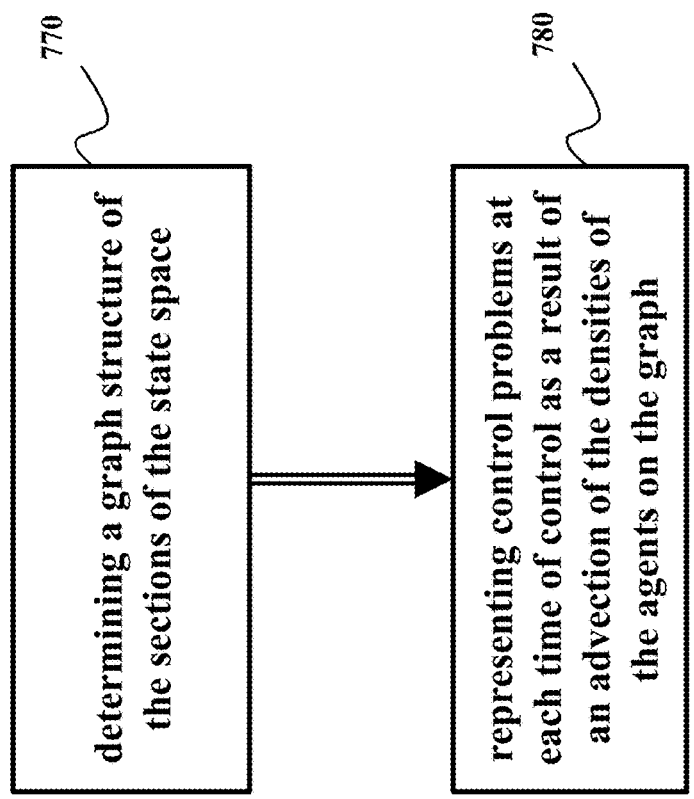
FIG. 7C is a flow chart of a method for representing the first and the second control problems as the time-varying flow rates according to one embodiment.

FIG. 7C shows a flow chart of a method for representing the first and the second control as the time-varying flow rates between the sections and the time-varying densities of the sections according to one embodiment. The embodiment determines 770 a graph, such as the graph 600, of the sections of the state space. Each vertex of the graph represents a section and neighboring vertices are connected by at least one edge.

The embodiment represents 780 the sequence of flows of the agents between neighboring sections of the state space at each time of control as a result of an movement of densities of the agents on the graph. This flow of densities is given by an advection equation, such as equation (4). This advection equation equates the rate of change of densities of agents at each section of state space to the difference between the incoming and outgoing flow into that section from the neighboring sections. This incoming and outgoing flow is a combination of flow due to natural dynamics, and due to action of control.

In various embodiments, the dynamics of individual agents are non-linear, and hence the embodiments are applicable to agents with non-trivial nonlinear dynamics. Because the embodiments make use of symmetry and sparsity in the optimization problem, the embodiments are scalable to much larger number of agents, do not rely on selecting specific agents, and hence robust to failure of any specific agents.

Figure 8:
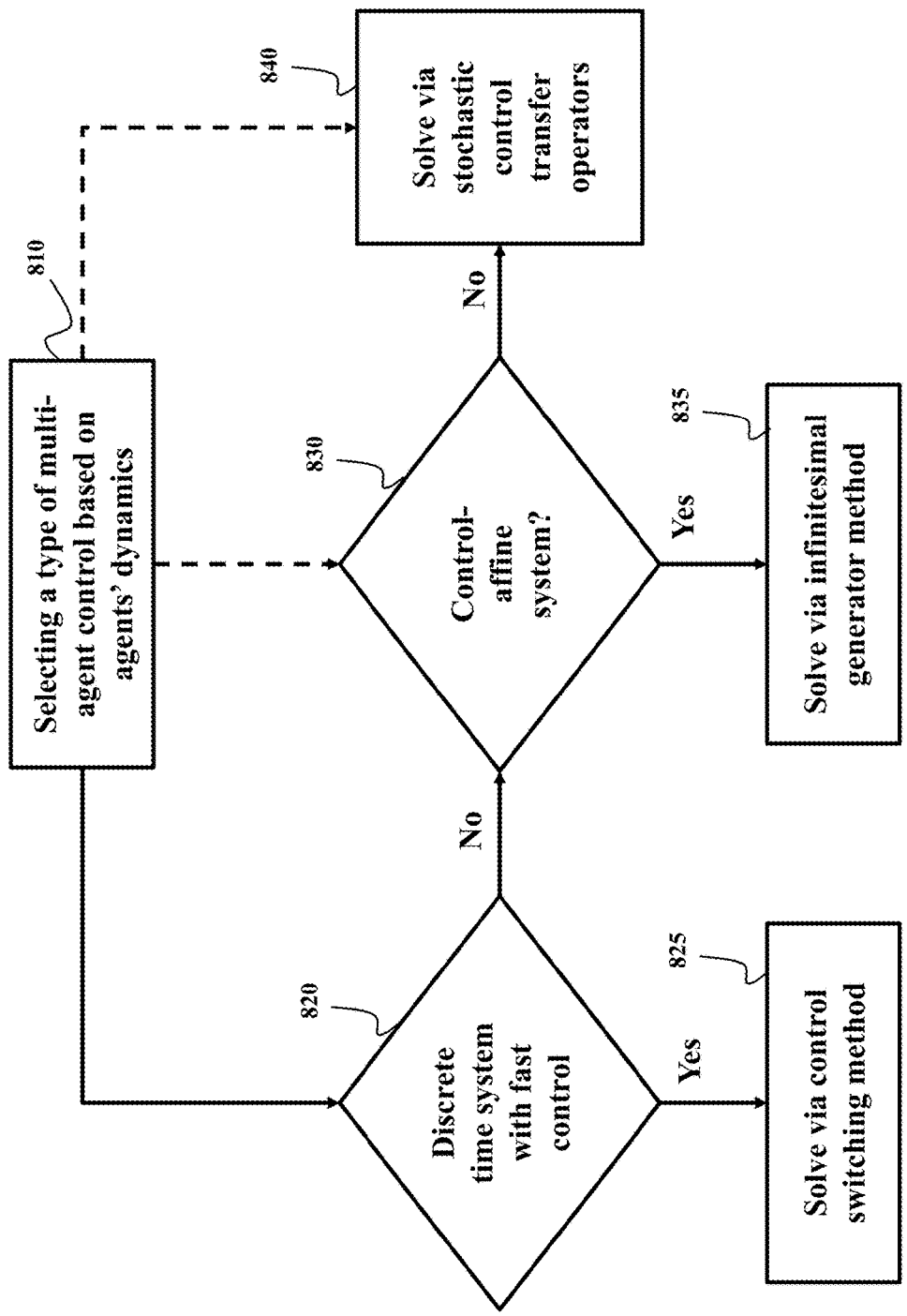
FIG. 8 is a schematic for selecting a type of multi-agent control based on dynamics of the agents according to one embodiment.

FIG. 8 shows a schematic for selecting 810 a type of multi-agent control based on dynamics of the agents. For example, one embodiment selects 820 a control switching method 825 when the dynamics of the agents are order of magnitude slower than controls. In that situation the time of application of the discrete time control is relatively small and effect of the discrete time control is dominant. To that end, the uncontrolled dynamics of the agents can be ignored for the duration of the application of the discrete time control.

Additionally or alternatively, if the agents follow non-linear control-affine dynamics 830, then a continuous time control via infinitesimal generator 835 is used. In contrast with time discrete switching method, the control-affine dynamics of the agents allows to formulate the multi-agent control problem as a continuous time control. Additionally or alternatively, some embodiments use the multi-agent control 840 based on stochastic transfer operator matrices.

Figure 9A:
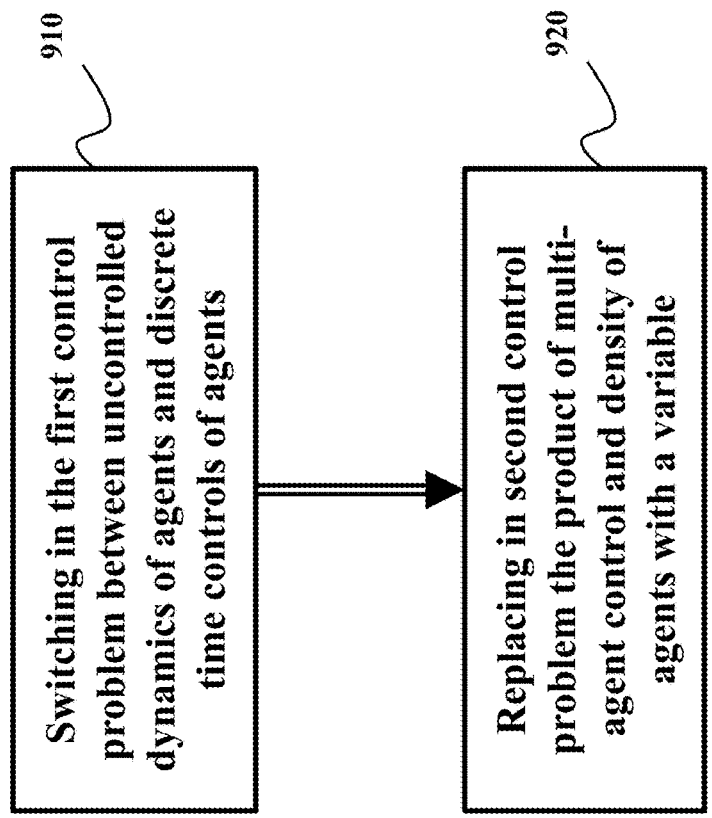
FIG. 9A is a block diagram of a control switching method according to one embodiment.

FIG. 9A shows a block diagram of a control switching method according to one embodiment. In this embodiment, the first control problem switches 910 between uncontrolled dynamics of the agents and discrete time controls of the agents. The uncontrolled dynamics of the agents is linear in the density space, while the discrete time controls of the agents are non-linear in the density space. In this embodiment, the uncontrolled dynamics of the agents include a product of a linear transfer operator of the non-linear dynamics of the agents with the current density of the agents, and the discrete time controls of the agents include a product of the control with the current density of the agents. To form the non-linear convex problem, the second control problem replaces 920 the product of the control and the current density of the agents with a variable.

Figure 9B:
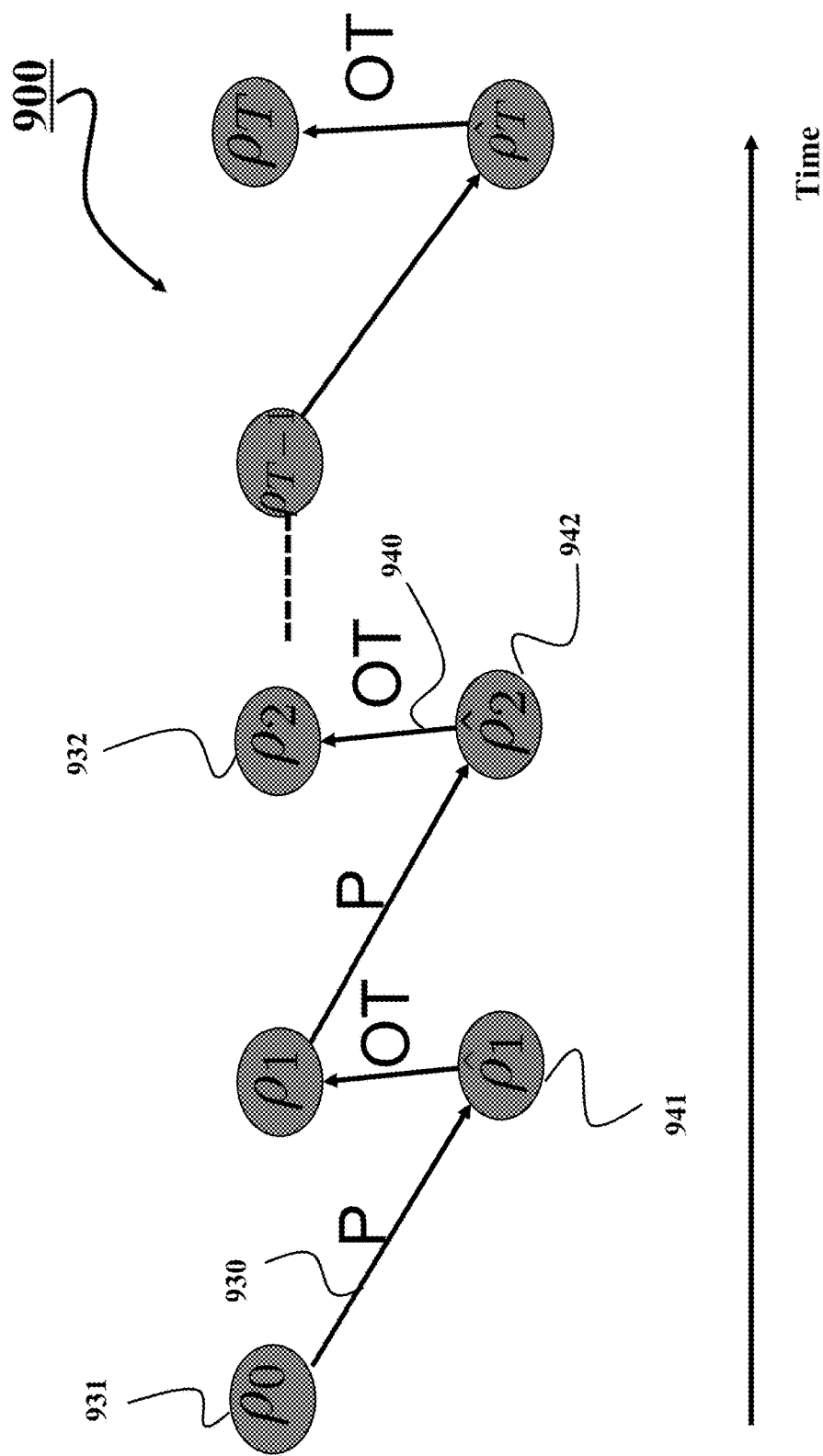
FIG. 9B shows a graph 900 illustrating the principles of the switching method of FIG. 9A.

FIG. 9B shows a graph 900 illustrating the principles of the switching method of FIG. 9A. The switching method is inspired by operator-splitting method, such that in different time steps of motion, different operators are used. Specifically, the multi-agent control is performed by switching between two types of transport to obtain the full transport from initial to desired final distribution in given time. The switching times can have the constant frequency. The first type of transport transforms is due to uncontrolled dynamics, e.g., 931 and 932 to obtain intermediate densities, e.g., 941 and 942. The first transport is performed using transfer operator P, 930. The second type of transport is due to the action of control, which is applied at discrete times, shown by OT, 940. The T-time step optimization problem includes solving for pair of densities $(\rho_i,\hat{\rho}_i)$ for i=1 to T. The latter density is obtained by evolution of the former under action of control.

Figure 9C:
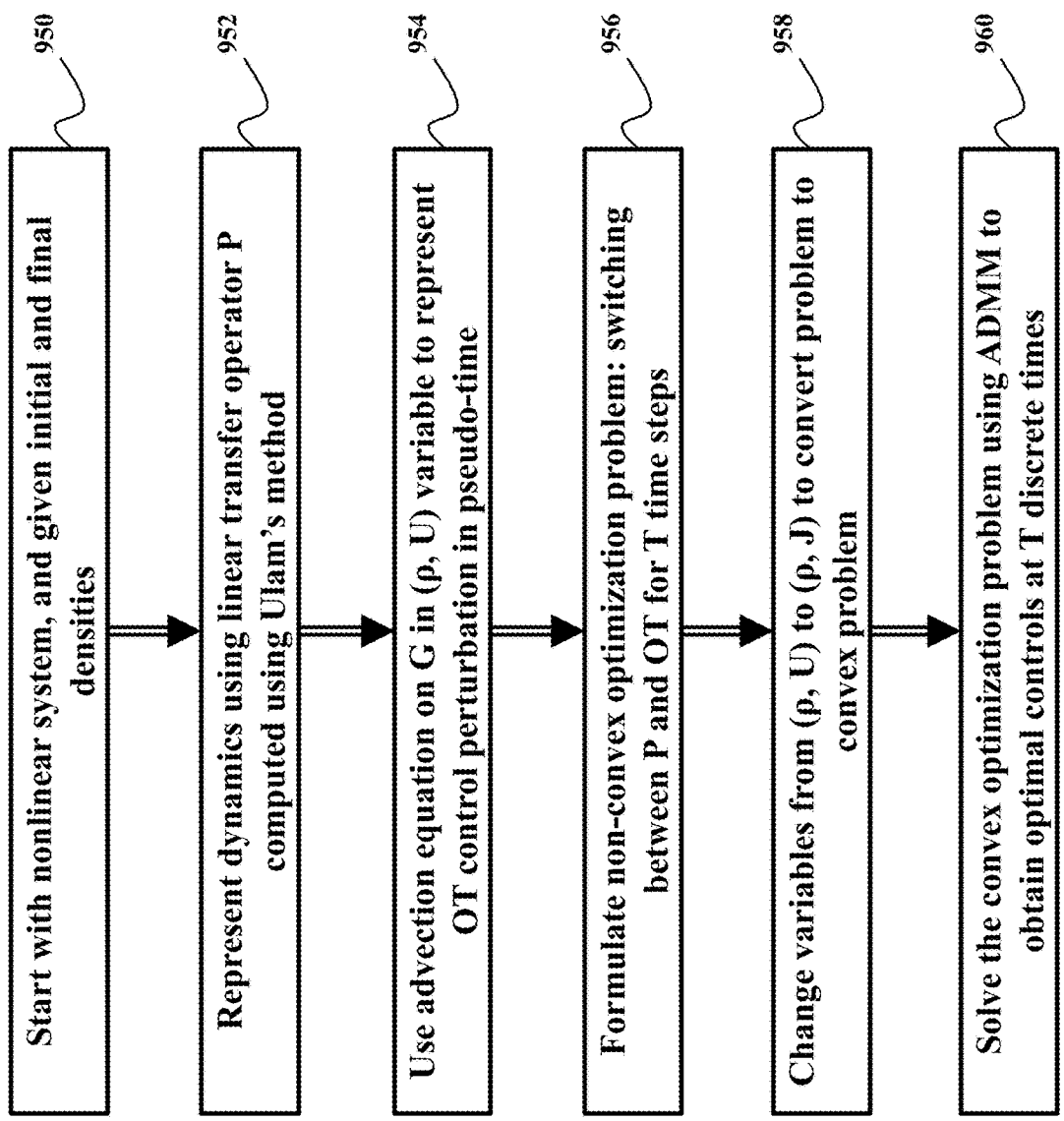
FIG. 9C is a flow chart of a switching method according to one embodiment.

FIG. 9C shows a detailed flow chart of a switching method according to one embodiment. The method is initialized 950 with defining dynamics of the agent and initial and final densities according to the following relations.

$$\rho_i = T_i \hat{\rho}_i, \quad (1)$$

wherein $\rho_i$ is density after ith control, $\hat{\rho}_i$ is ith density before ith control, and $T_i$ is the operator representing the action of ith control.

The densities $(\rho_i,\hat{\rho}_i)$ at time i are related by $$\hat{\rho}_i = \hat{\rho}_{i-1} P, \quad (2)$$

wherein $\hat{\rho}_i$ is the density before ith control, $\hat{\rho}_{i-1}$ is the density after (i−1)th control, P is the transfer operator representing the action of prior dynamics.

Figure 9D:
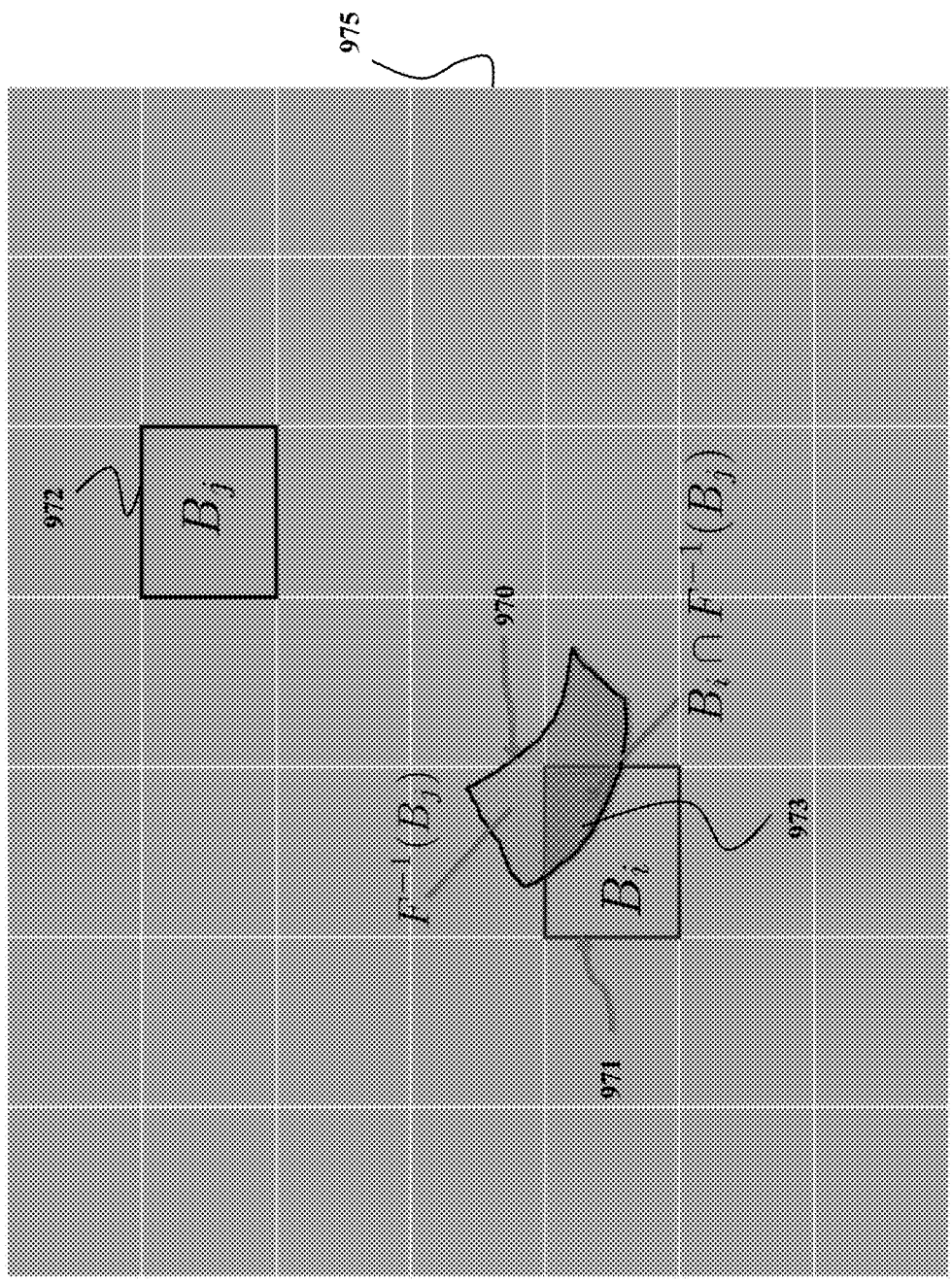
FIG. 9D is a schematic for determining a linear transfer operator according to one embodiment.

FIG. 9D shows a schematic for determining a linear transfer operator P determined using Ulam's method according to one embodiment. The state space 975 is discretized into a set of N sections $(B_1, B_2, \ldots, B_N)$ including a section $B_i$ 971 and a section $B_j$ 972. The matrix of transfer operator P for a section of the state space, such as a section Bj, obtained 952 by Ulam method. For example, the section 972 is sampled, e.g., uniformly, and pre-image 970 under the dynamics F is computed. The pre-image 970 is set of all points which land in section Bj in one time-step under prior dynamics. An area of the intersection 973 of the section 971 and the pre-image 970, divided by an area of the section 971 gives the (i,j) entry of matrix P.

The optimization problem includes minimizing the sum of squared cost of advection between the pair of densities $(\rho_i,\hat{\rho}_i)$, subject to the two equations above. It is realized that solving directly for optimal transport flow operators is computationally very expensive. Hence, some embodiments employ a continuous-time discrete space approach to solve the optimization problem.

For example, some embodiments determines a graph structure of the sections of the state space, each vertex of the graph represents a section and neighboring vertices are connected by at least one edge and represent the discrete time control of the agents for each section at each time of control as a result of an advection of the densities of the agents on the graph. For example, one embodiment use advection equation on G in $(\rho, U)$ variable to represent 954 OT control perturbation in pseudo-time and formulates 956 non-convex optimization problem by switching between P and OT for T time steps.

For example, the optimal transport (OT) step is computed by writing the transport as continuous-time flow on G between each pair as follows:

$$\min_{U(t,e) \geq 0, \rho(t,v) \geq 0} \int_0^1 U(t,e)^2 \left( \frac{\rho(v)}{\rho(w)} \frac{(\rho(v)+\rho(w))}{2} \right) dt, \quad (3)$$

$$\frac{d}{dt}\rho(t,v) = \sum_{e=w \to v} U(t,e)\rho(t,w) - \sum_{e=v \to w} U(t,e)\rho(t,v), \quad (4)$$

wherein $\rho(v)$ is mass in with vertex 620, $\rho(w)$ is mass in wth vertex 630, U(t, e) is control at time t on edge e 610, edge e is directed from vertex v to vertex w.

The equation (3) is the cost function to be minimized over velocities U as quasi-time variable goes 0 to 1. The equation describes the variation of density mass as quasi-time is increasing. This equation is discretized in quasi-time variable into a small number of steps using finite-difference method. A change of variable from velocity variable U to flow J, according to $$J = U\rho \quad (5)$$

transforms 958 the non-convex optimization problem into the convex optimization problem. After this transformation, discretized versions of above equations (3) and (4) are combined for each pair of distributions, along with relations given by equation (2). The full optimization problem is then solved 960 using one or the convex optimization solvers.

Figure 10A:
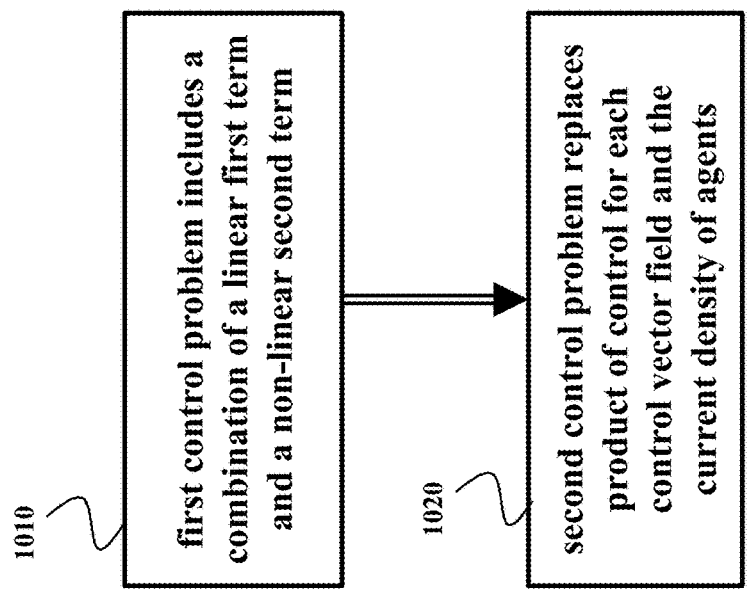
FIG. 10A is a block diagram of a multi-agent control according to one embodiment where the agents follow non-linear control-affine dynamics.

FIG. 10A shows a block diagram of a multi-agent control for the case according to one embodiment where the agents follow non-linear control-affine dynamics. In this embodiment, the first control problem includes 1010 a combination of a linear first term and a non-linear second term. The first term includes a product of a linear infinitesimal generator of non-linear uncontrolled dynamics of the agents with the current density of the agents, and the second term includes a product of a control, a linear infinitesimal generator of control vector fields, and the current probability density of the agents. To form the non-linear convex problem, the second control problem replaces 1020 the product of the control for each control vector field and the current density of the agents with a variable.

For example, this embodiment modifies the graph structure to allow direct computation of optimal control policies in single step, rather than using a switching approach. For example, the embodiment determines a graph structure of the sections of the state space. Each vertex of the graph represents a section and neighboring vertices are connected by at least one edge, and each edge is associated with a weight vector having weights given by the linear infinitesimal generator of control vector field. The embodiment represents the multi-agent control of the agents for each section at each time of the control as a result of an advection of the densities of the agents on the graph.

The control-affine dynamics of each agent can be written in a form $$\dot{x} = f(x) + \Sigma_i^k u_i g_i(x), \quad (7)$$

wherein x is a state of the agent, $u_i$ represents the ith control input, f is the natural dynamics vector field of each agent, and $g_i$ is the ith control vector field.

In this embodiment, (k+1) different edge weights of each edge, denoted as F(e) and $G_i(e)$ for edge e, are computed according to the flow of different vector fields. For example, this computation is done by using the infinitesimal generator of the transfer operator corresponding to each of the (k+1) vector fields. This infinitesimal generator computes the infinitesimal flow due to unit amplitude $U_i$ of each vector field across the boundary between two sections connected by the edge. Then, a modified optimal transport problem is formulated, where the unknowns are k time-varying control amplitudes over the each edge corresponding to the k control vector fields.

The first control problem can be formulated based on $$\min_{U_i(t,e) \geq 0, \rho(t,v) \geq 0} \int_0^1 \sum_i U_i(t, e)^2 \left( \frac{\rho(v)}{\rho(w)} \frac{(\rho(v) + \rho(w))}{2} \right) dt, \quad (8)$$

$$\frac{d}{dt}\rho(t, v) = \sum_{e=w \to v} G_0(e)\rho(t, w) - \sum_{e=v \to w} G_0(e)\rho(t, v) + \sum_{i=1}^n \sum_{e=w \to v} G_i(e)U_i(t, e)\rho(t, w) - \sum_{i=1}^n \sum_{e=v \to w} G_i(e)U_i(t, e)\rho(t, v) \quad (9)$$

wherein $U_i(t, e)$ is control amplitude of ith control vector field at time t over edge e 610, e is an edge that goes from vertex v 620 to vertex w 630. $G_0(e)$ is the value of infinitesimal generator of natural dynamics vector field f at edge e, $G_i(e)$ is the value of infinitesimal of ith control vector field $g_i$ at edge e.

To form the second control problem, the change of variables for each control, from control amplitude to flow can be performed, as follows.

$$J_i = U_i \rho. \quad (10)$$

Figure 10B:
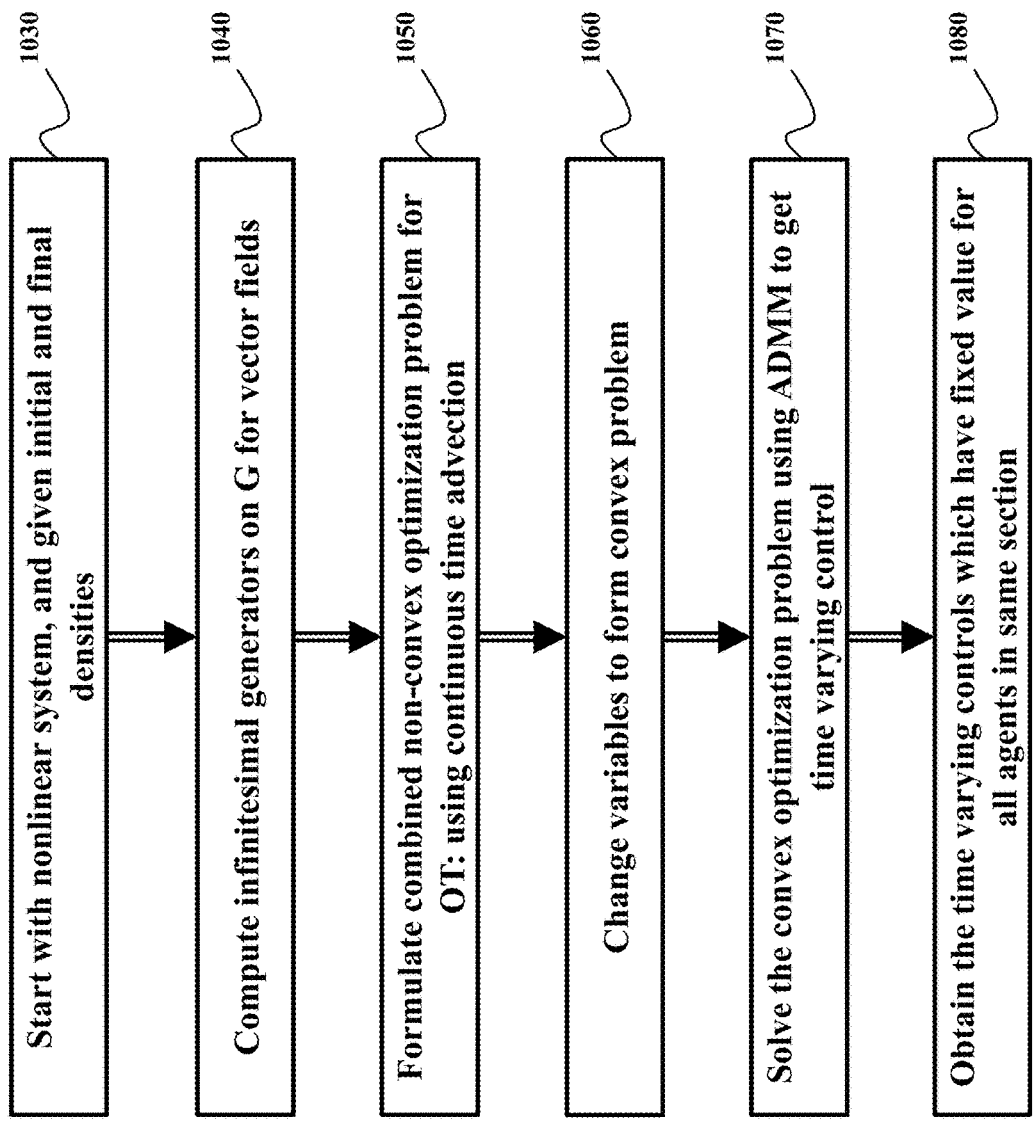
FIG. 10B is a flow chart of a method for multi-agent control with control-affine dynamics of each agent according to one embodiment.

The control inputs for each agent can be computed using the flows $J_i$ and control amplitudes $U_i$ can be computed by the optimization in equation (8). For example, one embodiment determines time-dependent net flow in or out of each section, for each vector field f and $g_i$. For example, the time-dependent net flow can be determined by computing time-dependent inflow minus outflow for each edge coming into, or going out of the jth section. After this process is completed for each vector field, control input for each vector field for each agent is set equal to this net flow. Hence, the feedback control for each agent is dependent on the section in which its state lies at current time, rather than the value of its exact state. As the size of section discretization is made smaller, the resulting control gets closer to the theoretically optimal control needed to perform optimal transport between desired distributions, subjected to dynamics in Equation (7). FIG. 10B shows a detailed flow chart of a method for control-affine dynamics of each agent according to one embodiment. The method is initialized 1030 with defining dynamics of the agent and initial and final densities according to the following relations. The dynamics of the agent are defined according to Equation (7). The method computes 1040 infinitesimal generators on G for vector fields, and formulates 1050 combined non-convex optimization problem equation (8) using continuous time advection equation (9). For example, the infinitesimal generator $G_i(e)$ over edge e, where e is the edge between vertices v and w, is computed by integrating the vector field $g_i$ over the face at the intersection of vertices v and w, and dividing by area of section belonging to vertex v.

Next, the method changes 1060 the variables, e.g., according to Equation (10) to form convex problem, and solves 1070 the convex optimization problem using ADMM to get time varying values of optimization variables ρ and J. In the post processing step 1080, the method determines control inputs u, having fixed values for all agents in same section.

Figure 11A:
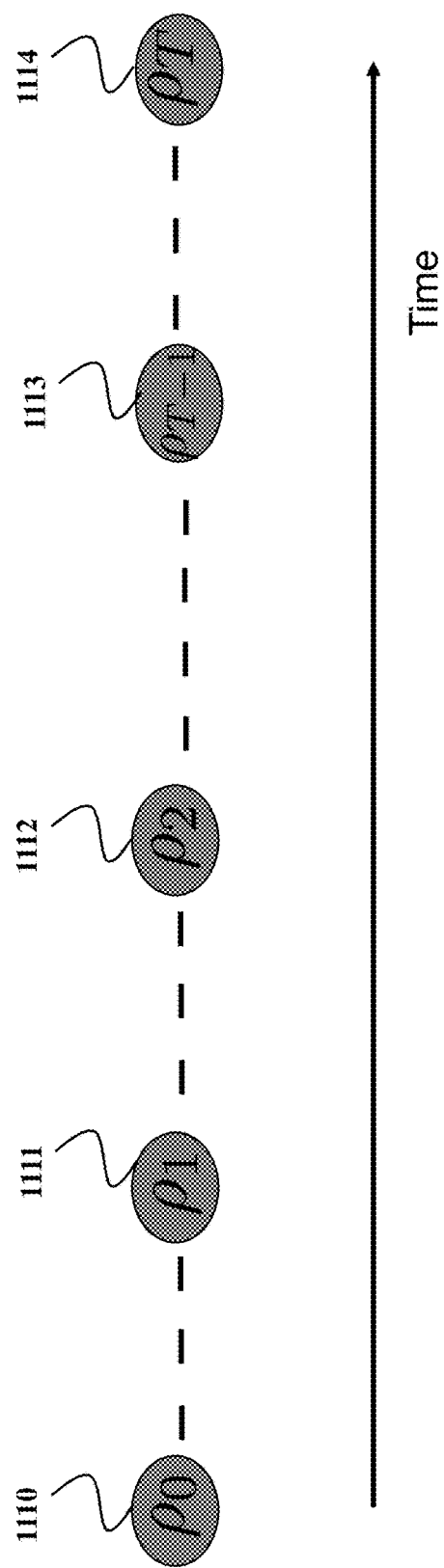
FIG. 11A is a schematic of stochastic control transfer operators method according to one embodiment.

FIG. 11A shows a schematic of stochastic control transfer operators method according to one embodiment. In this embodiment, the stochastic control policies 1110, 1111, 1112, 1113, and 1114 are computed for each time-step to achieve the intermediate distributions obtained in the first stage. In this embodiment, the control over agents in ith section of the state space is modeled as expectation over a finite number of possible "control transfer operators" $P^k$, i.e. a convex linear combination of different transfer operators. These control transfer operators are a result of discretizing allowable controls into a finite number of values, and then computing the corresponding operator $P^k$ under each finite value of control via the Ulam method. The unknowns to be solved for in the optimization problem include Q matrix, whose each row is vector of weights for each column of $P^k$.

For example, one embodiment formulate the first control problem using $$\rho_{t+1}(j) = \Sigma_{i,k} \rho_t(i) Q_{ik} P_{ij}^k, \quad (6)$$

wherein $\rho_t(i)$ is density at time t at ith section, $\rho_{t+1}(j)$ is density at time (t+1) at jth section, $Q_{ik}$ represents the probability of choosing kth control transfer operator $P^k$ for evolving agents whose state lies in ith section.

Next, the embodiment formulates the second control problem by replacing the a product of the multi-agent control and the density of the agents with a variable according to $$R_{ik} = \rho(i) Q_{ik}$$

Additionally or alternatively, it is realized that n-step controllability of the original system dynamics results in n-step controllability of the distributions. This allows for guaranteed existence of stochastic controls, each of which results in allowable control to individual agents. The cost of transport is a linear or quadratic cost on the control input, summed over all sections of the state space. One embodiment relaxes this problem formulation to allow for the possibility that the final density may not be exactly achievable by the control, or that the control required to achieve these distributions maybe infeasible. During the first stage of this relaxed formulation, the final distribution is imposed as a soft constraint by adding a penalty term to the cost function, which penalizes deviation of actual final density with the desired final density, and allows for approximate solutions.

Figure 11B:
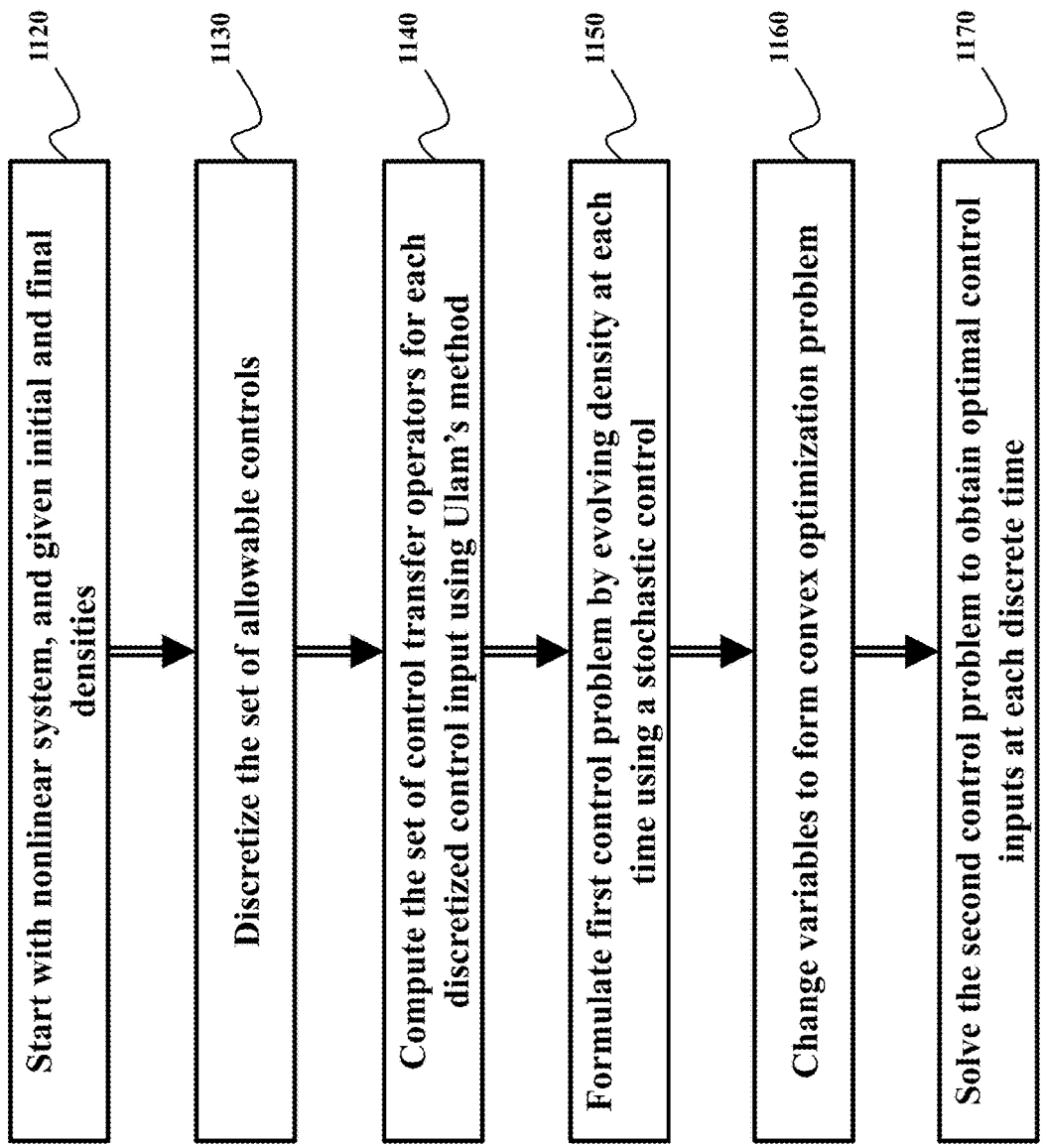
FIG. 11B is a flow chart of a method for stochastic multi-agent control method according to one embodiment.

FIG. 11B shows a flow chart of a method for stochastic multi-agent control method according to one embodiment. The method is initialized 1120 with defining dynamics of the agent and initial and final densities according to the following relations. The allowable controls for the agents are discretized 1130 to produce a set of discretized control inputs. For example, if the range of force input to a mobile system is [0,1] Newtons, then the discrete force inputs can be [0,0.2,0.4,0.6,0.8,1] Newtons.

The embodiment compute 1140 the set of control transfer operators for each discretized control input. For example, each control transfer operator can be determined using Ulam's method, as explained above with relation to FIG. 9D. The first control problem is formulated 1150 by evolving density at each time using a stochastic control. For example, the density can be evolved at each time using a stochastic control which is convex combination of $P^k$ with weights Q, see, e.g., Equation (6).

Next, the embodiment changes 1160 variables to form convex optimization problem and solves 1170 the second control problem to obtain optimal control inputs at each discrete time. For example, the embodiment replaces the a product of the multi-agent control and the density of the agents with a variable according to $R_{ik}=\rho(i)Q_{ik}$. To that end, the solution produces time varying values of R and $\rho$.

For those values, the embodiment can further determine the values Q to obtain optimal control inputs at each discrete time.

Figure 12:
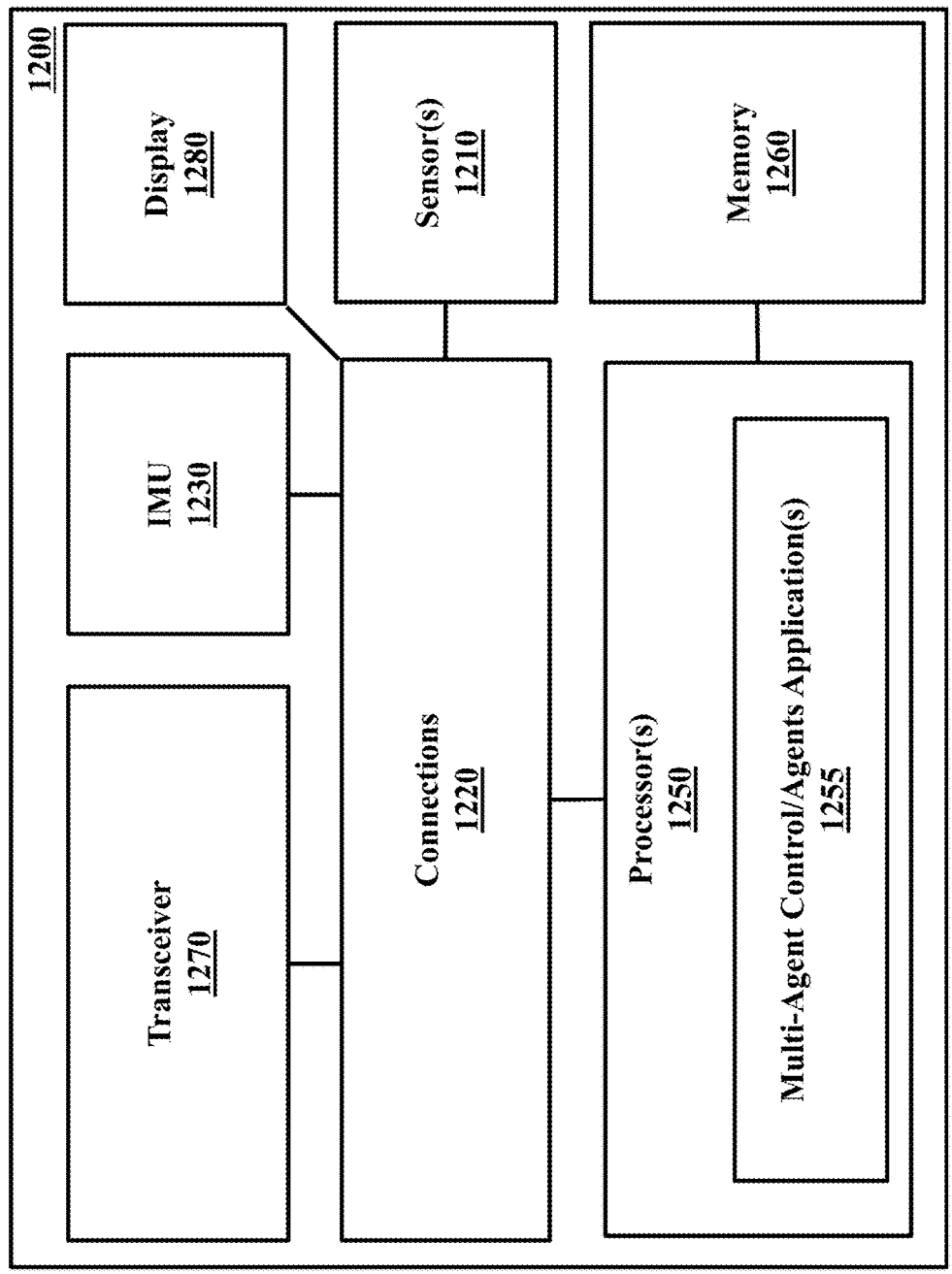
FIG. 12 is a block diagram of an exemplary system configured for multi-agent control.

FIG. 12 shows a block diagram of an exemplary system 1200 configured for multi-agent control. Various combinations of the components of the system 1200 can be implemented at the agents and/or at the multi-agent system for controlling the agents. The system 1200 can include one or combination of a sensor 1210, an inertial measurement unit (IMU) 1230, a processor 1250, a memory 1260, a transceiver 1270, and a display/screen 1280, which can be operatively coupled to other components through connections 1220. The connections 1220 can comprise buses, lines, fibers, links or combination thereof.

The transceiver 1270 implemented on the multi-agent control system can be used for receiving initial and final density of the agents and for communicating the control inputs to the agents. The transceiver 1270 implemented on an agent can be used for transmitting current states of the agents and/or for receiving the control inputs. The transceiver 1270 can, for example, include a transmitter enabled to transmit one or more signals over one or more types of wireless communication networks and a receiver to receive one or more signals transmitted over the one or more types of wireless communication networks. The transceiver 1270 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 1200 can also include one or more ports for communicating over wired networks.

In some embodiments, the system 1200 can comprise image sensors such as CCD or CMOS sensors, lasers and/or camera 1210, which are hereinafter referred to as "sensor 1210". The sensors 1210 can be used for sensing the state of the agents to determine the current density of the agents. The sensors 1210 can be used by the agents for performing the assigned applications. For example, the sensor 1210 can include color or grayscale cameras, which provide "color information." The term "color information" as used herein refers to color and/or grayscale information. For example, the sensor 1210 can include a depth sensor for providing "depth information." For example, in some embodiments, the sensor 1210 includes RGBD cameras, which may capture per-pixel depth (D) information when the depth sensor is enabled, in addition to color (RGB) images.

In some embodiments, the sensor 1210 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 400 can be operatively connected to multiple sensors 1210, such as dual front cameras and/or a front and rear-facing cameras, which may also incorporate various sensors. In some embodiments, the sensors 1210 can capture both still and video images. In some embodiments, the sensor 1210 can include RGBD or stereoscopic video cameras capable of capturing images at, e.g., 30 frames per second (fps). In one embodiment, images captured by the sensor 12410 can be in a raw uncompressed format and can be compressed prior to being processed and/or stored in memory 1260. In some embodiments, image compression can be performed by the processor 1250 using lossless or lossy compression techniques.

In some embodiments, the processor 1250 can also receive input from IMU 1230. In other embodiments, the IMU 430 can comprise 3-axis accelerometer(s), 3-axis gyroscope(s), and/or magnetometer(s). The IMU 1230 can provide velocity, orientation, and/or other position related information to the processor 1250. In some embodiments, the IMU 1230 can output measured information in synchronization with the capture of each image frame by the sensor 1210. In some embodiments, the output of the IMU 1230 is used in part by the processor 1250 to determine the density of the agents.

The system 1200 can also include a screen or display 1280 rendering images, such as color and/or depth images. In some embodiments, the display 1280 can be used to display live images captured by the sensor 1210. In some embodiments, the display 1280 can include and/or be housed with a touchscreen to permit users to input data via some combination of virtual keyboards, icons, menus, or other GUIs, user gestures and/or input devices such as styli and other writing implements. In some embodiments, the display 1280 can be implemented using a liquid crystal display (LCD) display or a light emitting diode (LED) display, such as an organic LED (OLED) display. In other embodiments, the display 480 can be a wearable display.

In some embodiments of the multi-agent control system, the processor 1250 can perform multi-agent control 1255 according to various embodiment. When the system 1200 is implemented on the agent, the processor 1250 can be configured to perform the applications 1255 assigned to the agents.

Exemplary system 1200 can also be modified in various ways in a manner consistent with the disclosure, such as, by adding, combining, or omitting one or more of the functional blocks shown. For example, in some configurations, the system 400 does not include the IMU 1230 or the transceiver 1270. Further, in certain example implementations, the system 1200 include a variety of other sensors (not shown) such as an ambient light sensor, microphones, acoustic sensors, ultrasonic sensors, laser range finders, etc. In some embodiments, portions of the system 1200 take the form of one or more chipsets, and/or the like.

The processor 1250 can be implemented using a combination of hardware, firmware, and software. The processor 1250 can represent one or more circuits configurable to perform at least a portion of a computing procedure or process related to sensor fusion and/or methods for further processing the fused measurements. The processor 1250 retrieves instructions and/or data from memory 1260. The processor 1250 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1260 can be implemented within the processor 1250 and/or external to the processor 1250. As used herein the term "memory" refers to any type of long term, short term, volatile, nonvolatile, or other memory and is not to be limited to any particular type of memory or number of memories, or type of physical media upon which memory is stored. In some embodiments, the memory 1260 holds program codes that facilitate performance of various embodiments.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1260 and/or the processor 1250.

Figure 13A:
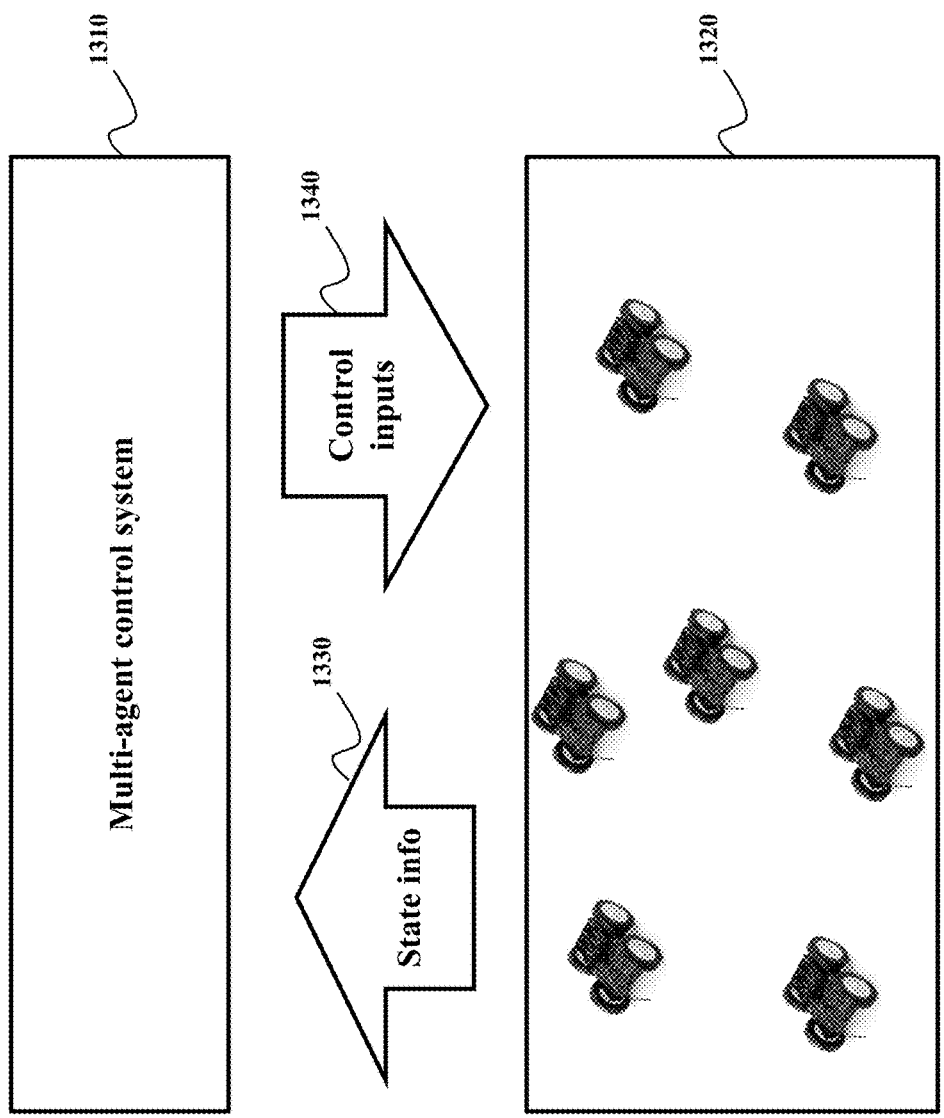
FIG. 13A is an example of a multi-agent control of micro-robots according to one embodiment.

FIG. 13A shows an example of a multi-agent control of density of micro-robots 1320 according to one embodiment. The robots determine and transmit their states 1330 to the multi-agent control system 1310. The states 1330 can be determined using an onboard GPS device. Using the states, the system 1310 determines and transmits the control inputs 1340 to the mobile robots. The transmission can include pairs of control inputs with corresponding sections of the states. The mobile robots select their control input that is paired with the section including their states and execute the control motion according the selected control input. The state and control inputs can be exchange using various kinds of transceivers, such as the transceiver 1270. In this example, the states include positions, velocities and/or orientation of the mobile robots. The states of the mobile robots can be determined using the IMU 1230 or sensors 1210. The control inputs can include new states, e.g., new positions for the mobile robots, trajectories for the mobile robots to follow and/or commands for the actuators of the mobile robots.

Figure 13B:
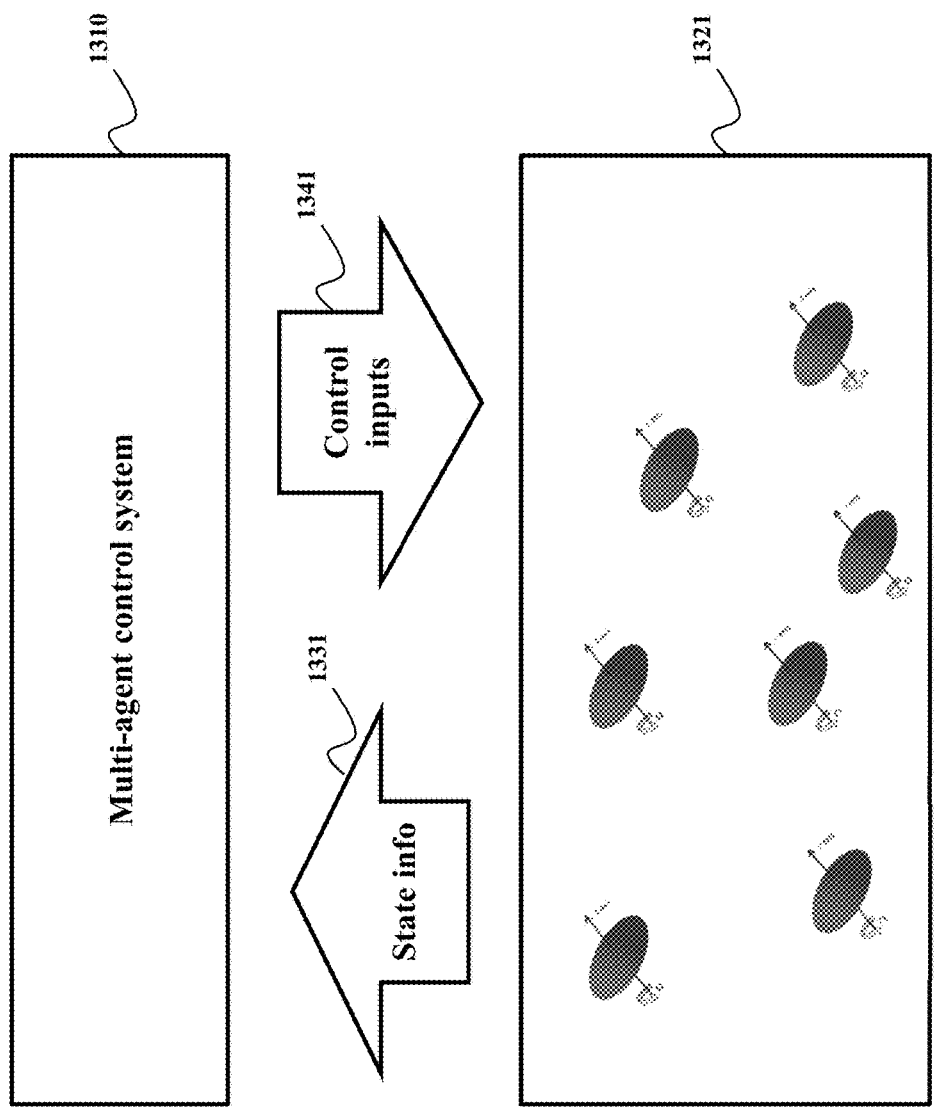
FIG. 13B is an example of a multi-agent control of density of agents according to another embodiment.

FIG. 13B shows an example of a multi-agent control of density of agents 1321 according to another embodiment. In this example, the state space is the space of rotation matrices defining an arrangement of the attitude of distribution of the agents 1321. In this case, the state 1331 can be determined by onboard gyroscopes, which can be part of the IMU 1230. The optimal transport is computed and attitude control information 1342 is relayed back to agents via, e.g., a wireless transmitter.

Figure 14:
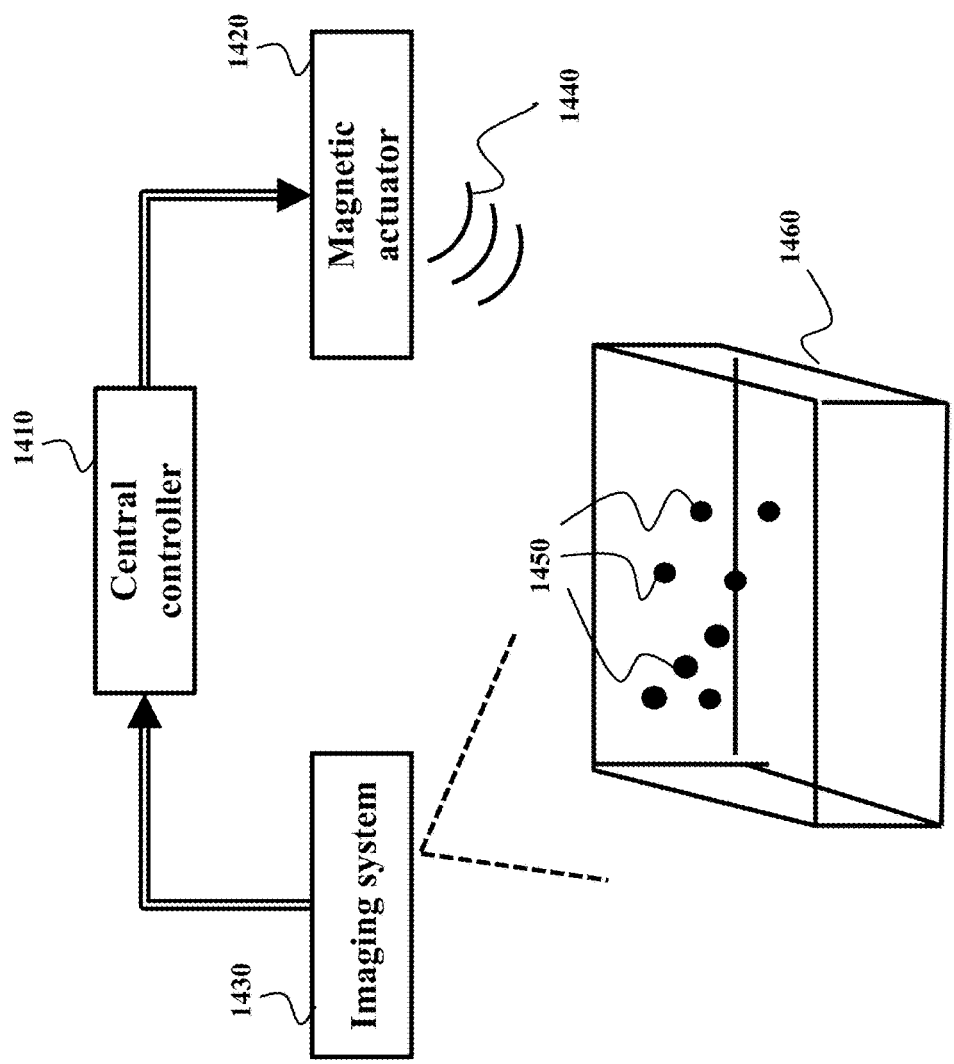
FIG. 14 is an example of a multi-agent control of density of agents according to another embodiment.

FIG. 14 shows another example of a multi-agent control of density of agents 1450 according to one embodiment. In this example, the multi-agent control system controls the density of magnetic particles 1450 in a complex fluid flow 1460. The system includes a central controller 1410 to determine the control inputs and an actuator 1420 to apply a control input corresponding to its section of the state space. For example, the actuator 1420 can include a magnetic actuator for applying a magnetic field 1440 to the agents. The magnetic field is determined by the control inputs. The state of the agents can be observed by an imaging system 1430. For example, the imaging system 1430 can include a camera and/or any other type or sensors suitable to determine positions and/or density of the magnetic particles.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a motion of multiple agents with identical non-linear dynamics, wherein an agent is a device capable to move in a controlled manner, comprising:
   a receiver to receive data indicative of at least one of an initial density of the agents in a state space and a final density of the agents in the state space at a given time, or a combination thereof, wherein the state space is partitioned into a set of sections, such that a density of a section of the state space is proportional to a number of agents having states within the section of the state space;

a processor configured to formulate a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space; transform the first control problem into a second control problem, wherein the second control problem is a non-linear convex problem over the density of the agents and a product of the multi-agent control and the density of the agents; and solve the second control problem to produce the control input for each section of the state space; and a controller to control a motion of each agent according to the produced a control input corresponding to its section of the state space.

2. The system of claim 1, wherein the processor is configured to represent the first and the second control problems as a sequence of flows of the agents between neighboring sections of the state space; solve the second control problem to produce time-varying flow rates between the sections of the state space and time-varying densities of the sections of the state space; and determine the control inputs at each control step from the time-varying flow rates between the sections and the time-varying densities of the sections.

3. The system of claim 2, wherein the processor is further configured to extract control amplitudes for each section at each time step of the control from the time-varying flow rates between the sections of the state space using the time-varying densities of the sections of the state space; determine a net control amplitude for each section of the state space in each feasible control direction at each time step of control by combining corresponding control amplitudes; and determine the control input in each feasible control direction at each time step of control as the corresponding net control amplitude.

4. The system of claim 2, wherein the processor is configured to represent the first and the second control problems by determining a graph structure of the sections of the state space, wherein each vertex of the graph represents a section and neighboring vertices are connected by at least one edge; and representing the sequence of flows of the agents between neighboring sections of the state space at each time of control as a result of an advection of the densities of the agents on the graph.

5. The system of claim 1,
wherein the first control problem switches between uncontrolled dynamics of the agents and discrete time controls of the agents, wherein the uncontrolled dynamics of the agents are linear in the density space, wherein the discrete time controls of the agents are non-linear in the density space, wherein the uncontrolled dynamics of the agents include a product of a linear transfer operator of the non-linear dynamics of the agents with the density of the agents, and wherein the discrete time controls of the agents include a product of the multi-agent control with the density of the agents; and
wherein the second control problem replaces the product of the multi-agent control and the density of the agents with a variable to form the non-linear convex problem.

6. The system of claim 5, wherein the processor solves the second control problem for constant frequency of switching times.

7. The system of claim 5, wherein the discrete time controls of the agents are at least ten times faster than the uncontrolled dynamics of the agents.

8. The system of claim 5, wherein the processor is configured to determine a graph structure of the sections of the state space, wherein each vertex of the graph represents a section and neighboring vertices are connected by at least one edge; and represent the discrete time control of the agents for each section at each time of control as a result of an advection of the densities of the agents on the graph.

9. The method of claim 1, wherein the agents follow non-linear control-affine dynamics,
wherein the first control problem includes a combination of a linear first term and a non-linear second term, wherein the first term includes a product of a linear infinitesimal generator of non-linear uncontrolled dynamics of the agents with the current density of the agents, and wherein the second term includes a product of the multi-agent control, a linear infinitesimal generator of control vector fields, and the density of the agents; and
wherein the second control problem replaces the product of the multi-agent control for each control vector field and the density of the agents with a variable to form the non-linear convex problem.

10. The system of claim 9, wherein the processor is configured to determine a graph structure of the sections of the state space, wherein each vertex of the graph represents a section and neighboring vertices are connected by at least one edge, wherein each edge is associated with a weight vector having weights given by the linear infinitesimal generator of control vector field; and represent the control of the agents for each section at each time of the control as a result of an advection of the densities of the agents on the graph.

11. The system of claim 1,
wherein the first control problem includes a product of convex linear combination of different control transfer operators with the density of the agent, wherein the control transfer operators are a result of discretizing allowable controls into a finite number of values; and
wherein the second control problem replaces the product the density of the agents and weights of the convex linear combination with a variable to form the non-linear convex problem.

12. The system of claim 1, wherein the controller comprises:
a transmitter to transmit a command to each agent to apply a control input corresponding to its section of the state space.

13. The system of claim 1, wherein the controller comprises:
an actuator to apply a control input corresponding to its section of the state space.

14. The system of claim 13, wherein the actuator includes a magnetic actuator for applying a magnetic field to the agents, wherein the magnetic field is determined by the control inputs.

15. The system of claim 1, wherein the receiver receives the initial states of the agents, and wherein the processor determines the initial probability density of the agents in the state space from the initial states of the agents.

16. A method for controlling a motion of multiple agents with identical non-linear dynamics, wherein an agent is a device capable to move in a controlled manner, comprising:
receiving data indicative of at least one of an initial density of the agents in a state space and a final density of the agents in the state space at a given time, or a combination thereof, wherein the state space is partitioned into a set of sections, such that a density of a section of the state space is proportional to a number of agents having states within the section of the state space;
formulating a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space;
transforming the first control problem into a second control problem, wherein the second control problem is a non-linear convex problem over the density of the agents and a product of the multi-agent control and the density of the agents;
solving the second control problem to produce the control input for each section of the state space;
and controlling a motion of each agent according to the produced control input corresponding to its section of the state space, wherein at least some steps of the method are performed using a processor.

17. The method of claim 16, further comprising:
representing the first and the second control problems as a sequence of flows of the agents between neighboring sections of the state space;
solving the second control problem to produce time-varying flow rates between the sections of the state space and time-varying densities of the sections of the state space; and
determining the control inputs at each control step from the time-varying flow rates between the sections and the time-varying densities of the sections.

18. The method of claim 17, further comprising:
extracting control amplitudes for each section at each time step of the control from the time-varying flow rates between the sections of the state space using the time-varying densities of the sections of the state space;
determining a net control amplitude for each section of the state space in each feasible control direction at each time step of control by combining corresponding control amplitudes; and
determining the control input in each feasible control direction at each time step of control as the corresponding net control amplitude.

19. The method of claim 17, further comprising:
determining a graph structure of the sections of the state space, wherein each vertex of the graph represents a section and neighboring vertices are connected by at least one edge; and
representing the sequence of flows of the agents between neighboring sections of the state space at each time of control as a result of an advection of the densities of the agents on the graph.

20. A non-transitory computer readable storage medium embodied thereon a program executable by a processor for performing a method, the method comprising:
receiving data indicative of at least one of an initial density of the agents in a state space and a final density of the agents in the state space at a given time, or a combination thereof, wherein an agent is a device capable to move in a controlled manner, wherein the state space is partitioned into a set of sections, such that a density of a section of the state space is proportional to a number of agents having states within the section of the state space;
formulating a first control problem optimizing a control cost of changing density of the agents from the initial density to the final density subject to dynamics of the agents in a density space, wherein the first control problem is a non-linear non-convex control problem over a multi-agent control and a density of the agents, wherein the multi-agent control is a function parameterized on the set of sections of the state space defining a control input for each section of the state space;
transforming the first control problem into a second control problem, wherein the second control problem is a non-linear convex problem over the density of the agents and a product of the multi-agent control and the density of the agents;
solving the second control problem to produce the control input for each section of the state space;
and controlling a motion of each agent according to the produced control input corresponding to its section of the state space.

* * * * *